United States Patent
Ouderkirk et al.

(10) Patent No.: US 11,526,129 B1
(45) Date of Patent: Dec. 13, 2022

(54) NANOVOIDED HOLOGRAPHIC STRUCTURES AND CORRESPONDING SYSTEMS AND METHODS

(71) Applicant: META PLATFORMS TECHNOLOGIES, LLC, Menlo Park, CA (US)

(72) Inventors: Andrew John Ouderkirk, Redmond, WA (US); Qi Zhang, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 173 days.

(21) Appl. No.: 16/213,906

(22) Filed: Dec. 7, 2018

(51) Int. Cl.
G03H 1/02 (2006.01)

(52) U.S. Cl.
CPC ......... *G03H 1/0272* (2013.01); *G03H 1/0248* (2013.01); *G03H 2001/0264* (2013.01); *G03H 2222/34* (2013.01); *G03H 2260/12* (2013.01); *G03H 2260/30* (2013.01)

(58) Field of Classification Search
CPC .............. G03H 1/0272; G03H 1/0248; G03H 2222/34; G03H 2260/12; G03H 2260/30; G03H 2001/0264; G02B 5/0247
See application file for complete search history.

(56) References Cited

U.S. PATENT DOCUMENTS

| | | | |
|---|---|---|---|
| 5,337,191 A | 8/1994 | Austin | |
| 6,166,855 A | 12/2000 | Ikeyama et al. | |
| 7,839,550 B1 * | 11/2010 | Billmers | G02B 5/32 359/15 |
| 9,720,141 B1 | 8/2017 | Cheng et al. | |
| 11,067,848 B1 * | 7/2021 | Ouderkirk | G02B 26/001 |
| 2002/0186928 A1 | 12/2002 | Curtis | |
| 2002/0191268 A1 | 12/2002 | Seeser et al. | |
| 2004/0036932 A1 * | 2/2004 | Korzinin | G03H 1/02 359/7 |
| 2007/0020404 A1 | 1/2007 | Seiberle et al. | |
| 2007/0202273 A1 | 8/2007 | Hirai et al. | |
| 2009/0268299 A1 | 10/2009 | Furui et al. | |
| 2010/0002190 A1 | 1/2010 | Clarke et al. | |
| 2010/0314704 A1 | 12/2010 | Matsugai | |
| 2013/0215513 A1 | 8/2013 | Liang et al. | |

(Continued)

OTHER PUBLICATIONS

Non-Final Office Action received for U.S. Appl. No. 16/197,400 dated Apr. 8, 2020, 20 pages.

(Continued)

*Primary Examiner* — Kimberly N. Kakalec
(74) *Attorney, Agent, or Firm* — FisherBroyles, LLP

(57) ABSTRACT

An interference structure having a nanovoided hologram material is described. The nanovoided hologram material may have an index of refraction difference of approximately 0.4. The interference structure may include about 10% to 90% nanovoids by volume. The interference structure may be formed using a mixture of a monomer, an initiator, and solvent. The mixture may be disposed on a substrate and irradiated with two sources of light spaced apart from each other and shining on the same region of the mixture to generate an interference pattern in the mixture, leading to the selective polymerization of regions of the mixture where there is constructive interference of light. Various other devices, methods, and systems are also disclosed.

20 Claims, 11 Drawing Sheets

(56) References Cited

U.S. PATENT DOCUMENTS

| | | | |
|---|---|---|---|
| 2014/0080040 A1* | 3/2014 | Fontecchio | G03H 1/024 430/2 |
| 2015/0192728 A1 | 7/2015 | Thompson et al. | |
| 2015/0301667 A1 | 10/2015 | Yano et al. | |
| 2015/0346416 A1 | 12/2015 | Wolk et al. | |
| 2017/0192595 A1* | 7/2017 | Choi | G06F 3/0416 |
| 2017/0362502 A1 | 12/2017 | Lee et al. | |
| 2018/0093456 A1 | 4/2018 | Van Overmeere et al. | |
| 2019/0310394 A1 | 10/2019 | Miyamoto et al. | |

OTHER PUBLICATIONS

Final Office Action received for U.S. Appl. No. 16/197,400 dated Sep. 16, 2020, 20 pages.
Preinterview First Office Action received for U.S. Appl. No. 16/170,002 dated Jul. 31, 2020, 18 pages.
U.S. Appl. No. 16/197,400, filed Nov. 21, 2018.
Mullin et al., "Pattern Transformation Triggered by Deformation", Physical Review Letters, vol. 99, No. 8, 2007, 4 pages.
Babaee et al., "3D Soft Metamaterials with Negative Poisson's ratio", Advanced Materials, vol. 25, No. 36, 2013, 18 pages.
Bertoldi et al., "Novel negative Poisson's ratio behavior induced by an elastic instability", Advanced Materials, vol. 22, No. 3, 2010, pp. 1-11.
Overvelde et al., "Relating pore shape to the non-linear response of periodic elastomeric structures", Journal of the Mechanics and Physics of Solids, vol. 64, 2014, 16 pages.
Shen et al., "Simple cubic three-dimensional auxetic metamaterials", Physic. Status Solidi (B), vol. 251, No. 8, 2014, pp. 1515-1522.
Correa et al., "Negative Stiffness Honeycombs for Recoverable Shock Isolation", Rapid Prototyping Journal, vol. 21, No. 2, 2015, pp. 702-713.
Coulais et al., "Discontinuous Buckling of Wide Beams and Metabeams", Physical Review Letters, vol. 115, 2015, 7 pages.
Bickel et al., "Design and Fabrication of Materials with Desired Deformation Behavior", ACM Transactions on Graphics (TOG), vol. 29, No. 4, Jul. 2010, 10 pages.
Rosset et al., "Small, fast, and tough: Shrinking down integrated elastomer transducers", Applied Physics Reviews, vol. 3, No. 3, 2016, pp. 1-27.
Plante et al., "Large-scale failure modes of dielectric elastomer actuators", International Journal of Solids and Structures, vol. 43, 2006, pp. 7727-7751.
"Optotune DEAPs", Electroactive polymers, URL: https://www.optotune.com/technology/electroactive-polymers, 2019, 3 pages.
PRODUCT—Novasentis, "EMP Haptic Actuators For Sensory Innovation", URL: https://www.novasentis.com/product, 2019, 4 pages.
Rosset et al., "Mechanical characterization of a dielectric elastomer microactuator with ion-implanted electrodes", Sensor and Actuators A 144, 2008, 25 pages.
Gerratt et al., "Dielectric breakdown of PDMS thin films", Journal of Micromechanics and Microengineering, vol. 23, Apr. 26, 2013, 8 pages.

Hunt et al., "A self-healing dielectric elastomer actuator", Applied Physics Letters, vol. 104, 2014, 4 pages.
Skov et al., "Optimization Techniques for Improving the Performance of Silicone-Based Dielectric Elastomers", Advanced Engineering Materials, vol. 20, 2018, pp. 1-21.
Mazurek et al., "Glycerol as high-permittivity liquid filler in dielectric silicone elastomers", Journal of Applied Polymer Science, vol. 133, No. 43, 2016, 28 pages.
Rao et al., "Synthesis of flexible silica aerogels using methyltrimethoxysilane (MTMS) precursor", Journal of Colloid and Interface Science, vol. 300, 2006, pp. 279-285.
Seo et al., "Reticulated Nanoporous Polymers by Controlled Polymerization-Induced Microphase Separation", Science, vol. 336, Jun. 15, 2012, 5 pages.
Jennings, S.G., "The mean free path in air", Journal of Aerosol Science, vol. 19, No. 2, 1988, pp. 1-2.
Gupta et al., "Nanoemulsions: formation, properties and applications", Soft Matter, 2016, 16 pages.
Helgeson et al., "Mesoporous organohydrogels from thermogelling photocrosslinkable nanoemulsions", Nature Materials, vol. 11, Apr. 2012, pp. 344-352.
Guha et al., "Creating nanoscale emulsions using condensation", Nature Communications, vol. 8, No. 1371, Nov. 8, 2017, pp. 1-7.
Meier et al., "Microemulsion elastomers", Colloid Polymer Science, vol. 274, 1996, pp. 218-226.
Richter et al., "Design considerations of form birefringent microstructures", Applied Optics, vol. 34, No. 14, May 10, 1995, pp. 2421-2429.
Mahadik et al., "Elastic and Superhydrophobic Monolithic Methyltrimethyoxysilane-based Silica Aerogels by Two-step sol-gel process", Journal Microelectron, vol. 23, No. 1, 2016, pp. 35-39.
Crawford, Gregory P., "Electrically Switchable Bragg Gratings", Optics & Photonics News, Apr. 30, 2003, pp. 54-59.
International Search Report and Written Opinion received for PCT Application Serial No. PCT/IB2019/056844 dated Mar. 13, 2020, 15 pages.
Kim et al., "Enhanced oxygen detection using porous polymeric gratings with integrated recognition elements", ScienceDirect, Sensors and Actuators B, vol. 130, No. 2, Nov. 17, 2007, pp. 758-764.
Kim et al., "Tunable Porous Photonic Bandgap Structures for Chemical and Biological Sensing", Proceedings of the SPIE, vol. 6322, Article: 632201, Aug. 30, 2006, pp. 1-10.
Notice of Allowance received for U.S. Appl. No. 16/197,400 dated Mar. 24, 2021, 25 pages.
Non-Final Office Action received for U.S. Appl. No. 16/170,002 dated Dec. 8, 2020, 51 pages.
Notice of Allowance received for U.S. Appl. No. 16/170,002 dated Feb. 9, 2021, 43 pages.
Non-Final Office Action received for U.S. Appl. No. 16/170,002 dated May 28, 2021, 49 pages.
Non-Final Office Action received for U.S. Appl. No. 16/213,902 dated Jan. 21, 2021, 21 pages.
Final Office Action received for U.S. Appl. No. 16/213,902 dated Mar. 22, 2021, 17 pages.
Non-Final Office Action received for U.S. Appl. No. 16/213,902 dated Jul. 2, 2021, 22 pages.

* cited by examiner

NANOVOIDED HOLOGRAPHIC STRUCTURES AND CORRESPONDING SYSTEMS AND METHODS

BACKGROUND

Augmented reality (AR) and virtual reality (VR) eyewear devices or headsets may enable users to experience events, such as interacting with people in a computer-generated simulation of a three-dimensional world or viewing data superimposed on a real-world view. AR/VR eyewear devices and headsets may also be used for purposes other than recreation. For example, governments may use such devices for military training simulations, doctors may use such devices to practice surgery, and engineers may use such devices them as visualization aids.

AR/VR eyewear devices and headsets typically include some form of optical system or device, such as an optical lens assembly configured to focus or direct light from the device's display and/or the real world to the user's eyes. Thus, there is a need for improving such optical systems.

SUMMARY

As will be described in greater detail below, the instant disclosure describes nanovoided holographic structures and associated systems and methods.

In various aspects, an interference structure is described. The interference structure may be configured to generate a hologram. The interference structure may include a material defining a plurality of nanovoids arrayed in a periodic arrangement, the material including a first region having a first refractive index, and a second region having a second refractive index.

In one embodiment, a difference between the first refractive index and the second refractive index may be approximately 0.3 to approximately 0.5. In another embodiment, the material may include at least one of a polymer or an oxide. In one embodiment, the interference structure may be fabricated using an interference pattern between two coherent light sources incident on a photo-polymerizable monomer. In another embodiment, the interference structure may include a thickness greater than a periodicity of the interference pattern or a thickness less than the periodicity of the interference pattern. In one embodiment, the material may include a concentration of the plurality of nanovoids per unit volume of approximately 10% to approximately 70%.

In another embodiment, the interference structure may further include a first transparent conductor electrically coupled to a first side of the material, and a second transparent conductor electrically coupled to a second side of the material. In one embodiment, a first voltage may be applied between the first transparent conductor and the second transparent conductor in a first state, and a second voltage may be applied between the first transparent conductor and the second transparent conductor in a second state, the first voltage being less than the second voltage. In another embodiment, the material has the first refractive index in the first state and the material has the second refractive index in the second state, the second refractive index being less than the first refractive index.

In various embodiments, an optical system is disclosed. The optical system may include an optical component, and an interference structure coupled to the optical component. In another embodiment, the interference structure may be configured to generate a hologram, and the interference structure may include a material defining a plurality of nanovoids. In another embodiment, the material may include a first region having a first refractive index, and a second region having a second refractive index.

In another embodiment, a thickness of the material and a concentration of the plurality of nanovoids per unit volume in the material may be configured to adjust an optical property associated with the optical system, the optical property including at least one of a reflectance, an absorption, or a transmittance of light incident on the optical system.

In one embodiment, the material may be laminated to a surface of a first optical component. In another embodiment, the material may be coupled to a surface of the optical component by an adhesive material. In one embodiment, the surface of the optical component may be convex, concave, flat, or irregular. In another embodiment, the interference structure may include a thickness greater than a periodicity of an interference pattern used to generate the interference structure or a thickness less than the periodicity of the interference pattern. In one embodiment, the material may include a concentration of the plurality of nanovoids per unit volume of approximately 10% to approximately 70%.

In an embodiment, a method is described. The method may include irradiating a curable material with a first coherent light source and a second coherent light source to generate an interference pattern in the curable material, generating a plurality of nanovoids defined in the curable material based on the interference pattern, and curing the curable material to form an interference structure including a cured material. The cured material may include a first region having a first refractive index, and a second region having a second refractive index.

In one embodiment, a difference between the first refractive index and the second refractive index may be approximately 0.3 to approximately 0.5. In another embodiment, the interference structure may include a thickness greater than a periodicity of the interference pattern or a thickness less than a periodicity of the interference pattern. In one embodiment, the material may include a concentration of the plurality of nanovoids per unit volume of approximately 10% to approximately 70%.

While the exemplary embodiments described herein are susceptible to various modifications and alternative forms, specific embodiments will be described in detail herein. However, the exemplary embodiments described herein are not intended to be limited to the particular forms disclosed. Rather, the instant disclosure covers all modifications, equivalents, and alternatives falling within this disclosure.

Features from any of the embodiments of the present disclosure may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
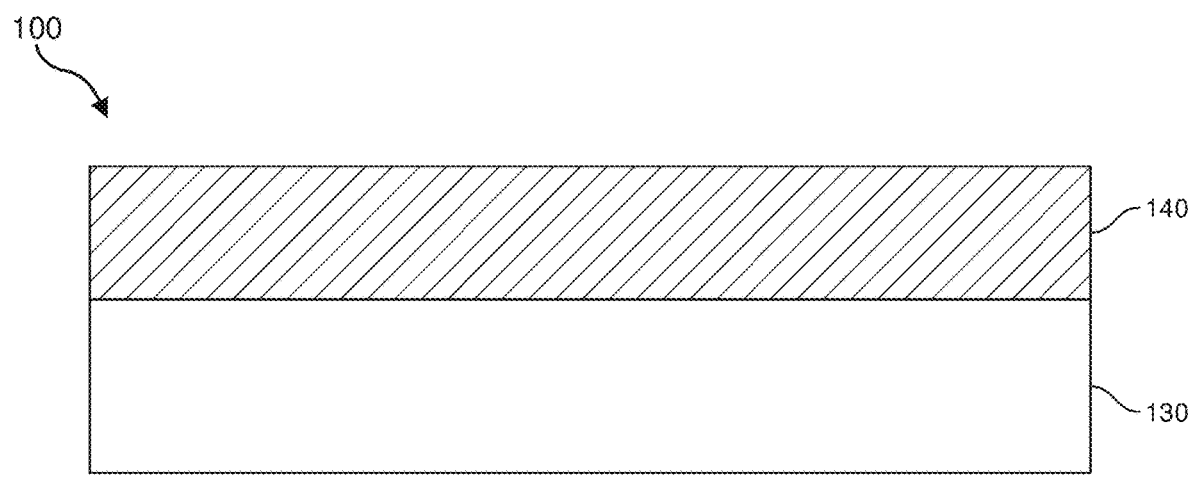
FIG. 1A shows a side view of an interference structure, in accordance with example embodiments of the disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be explained in greater detail below, embodiments of the instant disclosure are generally directed to nanovoided holographic structures, and methods and systems for manufacturing or forming such nanovoided holographic structures.

In various embodiments, an interference structure is described. The interference structure may include a hologram material (e.g., a thin-film hologram or volume hologram material). In another embodiment, the interference structure may include a nanovoided material having an index of refraction difference (delta n) of approximately 0.4 (as compared with 0.2 for conventional hologram materials). In another embodiment, in addition to a higher index of refraction difference (delta n), the index of refraction difference may stem from the ratio of polymer to nanovoids in the holographic material including the interference structure. In one aspect the interference structure including the hologram material may include about 10% to 90% nanovoids by volume.

In one aspect, the hologram material may be formed using a mixture of a monomer (e.g., acrylates or any type of photo-initiable monomer), an initiator (e.g., molecules including vinyl, azo, and peroxide groups), and solvent. The mixture may be disposed on a substrate and irradiated with two sources of light spaced apart from each other and shining on the same region of the mixture to generate an interference pattern in the mixture, leading to the selective polymerization of regions of the mixture where there is constructive interference of light. In another embodiment, actinic radiation source (e.g., ultraviolet light) can be used to anneal and/or cure the mixture and thereby solidify the interference pattern corresponding to the hologram into the hologram material.

Figure 9:
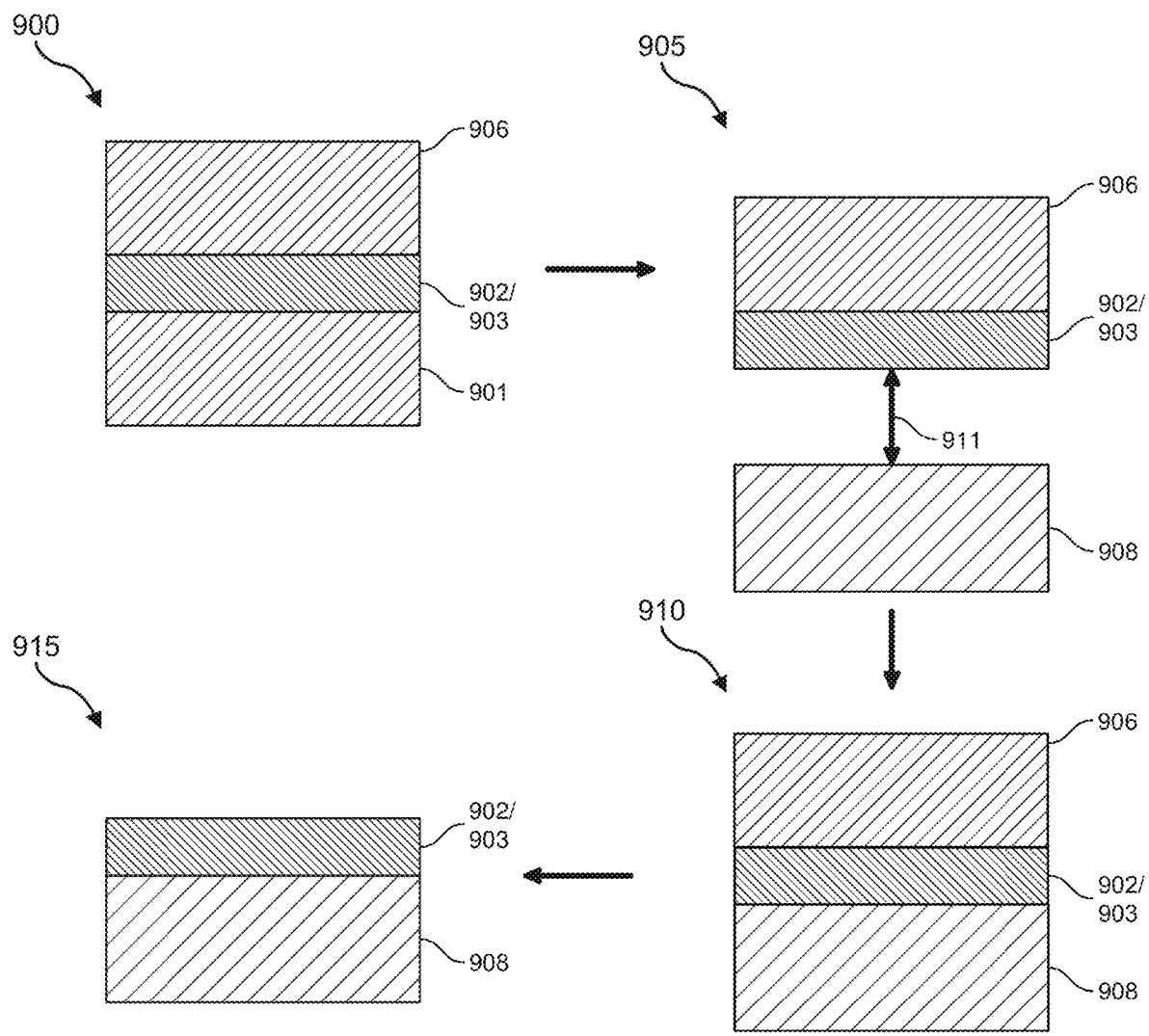
FIG. 9 shows a diagram of an example method of using an index gradient structure, in accordance with example embodiments of the disclosure.
Figure 10:
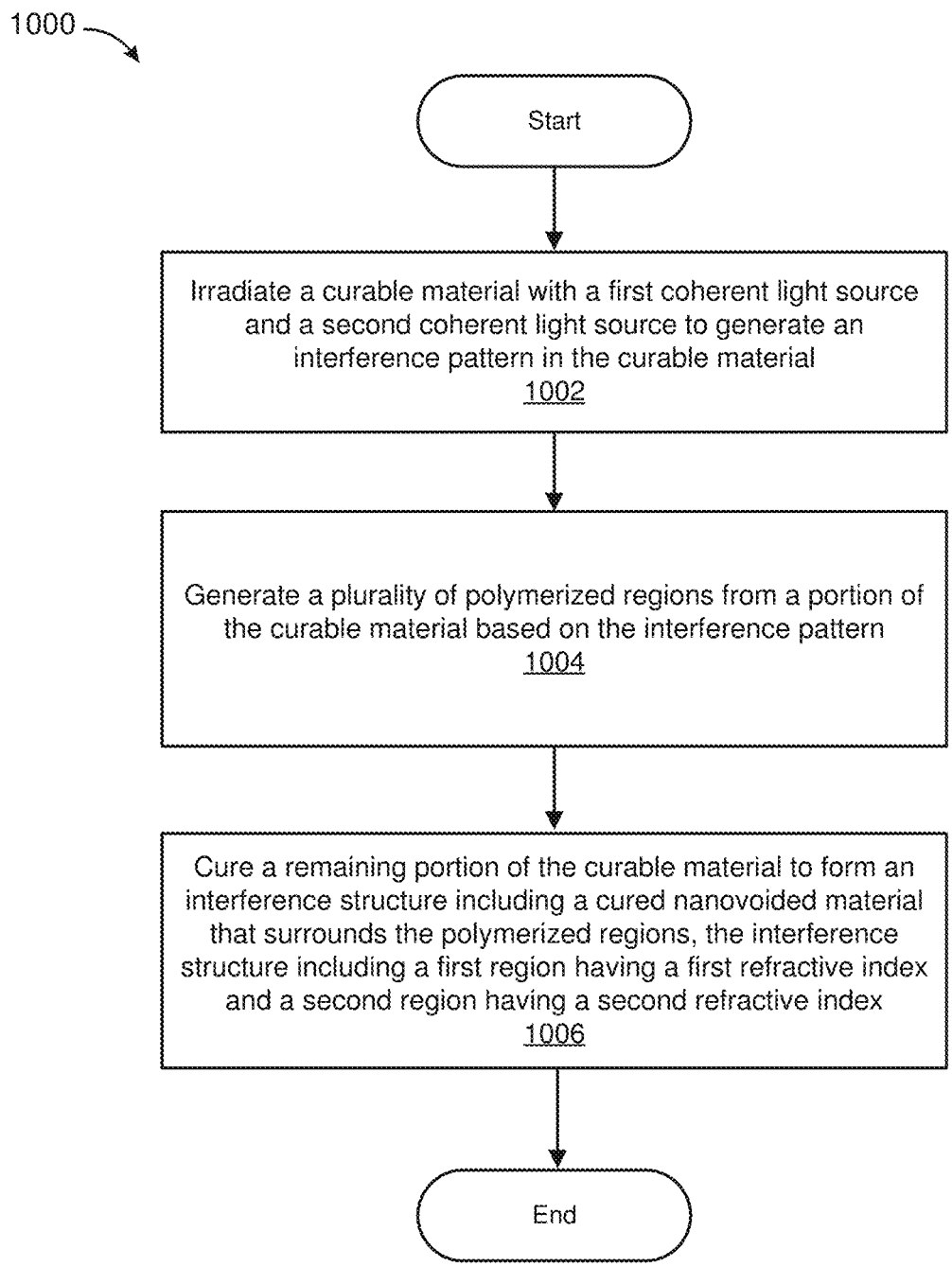
FIG. 10 shows a diagram of an example method for the fabrication of an index gradient structure, in accordance with example embodiments of the disclosure.
Figure 11:
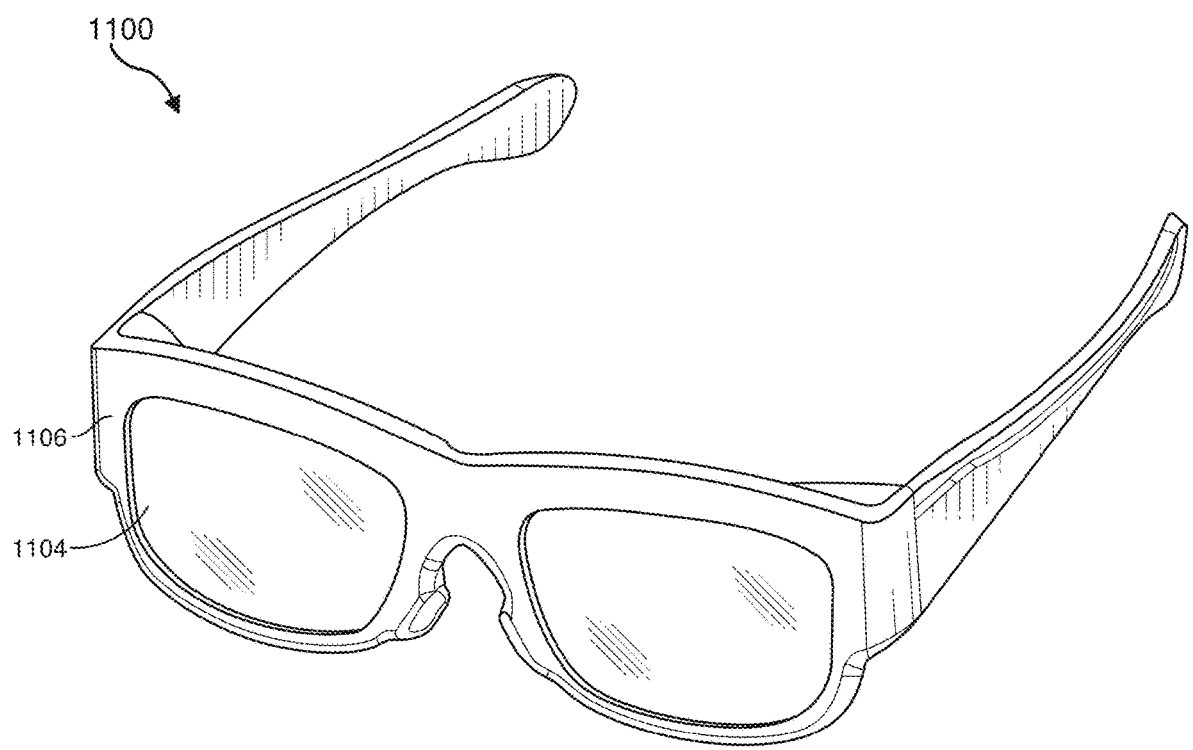
FIG. 11 shows a diagram of a head-mounted display (HMD), in accordance with example embodiments of the disclosure.

The following will provide, with reference to FIGS. 1-11, detailed descriptions of systems, methods, and apparatuses for optical systems implementing interference structures (e.g., holograms) and devices including interference structures. The discussion associated with FIGS. 1A-1B includes a description of an interference structure including a holographic material having nanovoids of different types that may be used with various embodiments. The discussion associated with FIGS. 2-4 includes a description of another electroactive device incorporating the interference structure that may additionally or alternatively be used with various embodiments. The discussion associated with FIGS. 5-8 include descriptions of fabrication systems and methods that may be used to make the interference structure, in accordance with various embodiments. The discussion associated with FIG. 9 includes a description of a lamination process that may be used to couple the interference structure to an optical element in accordance with various embodiments. The discussion associated with FIG. 10 includes a description of an example flow that may be used to make the interference structure in accordance with various embodiments. The discussion relating to the embodiment depicted in FIG. 11 shows an example near-eye-display (NED) that may incorporate the disclosed interference structure and/or electroactive devices, in accordance with example embodiments. While many of the examples discussed herein may be directed to head-worn display systems, embodiments of the instant disclosure may be implemented in a variety of different types of devices and systems.

FIG. 1A shows a diagram of an interference structure, in accordance with example embodiments of the disclosure. In particular, the interference structure 100 may include a holographic material (e.g., a volume holographic material) that may scatter incident light by a three-dimensional distribution of nanovoids in a nanovoided layer 140. In some embodiments, a volume hologram may refer to a hologram where the thickness of the recording medium (e.g., the nanovoided layer) may be greater than the spacing of the interference pattern in the recording medium.

As noted, in some embodiments, the interference structure 100 may include a switchable volume hologram. In another embodiment, the switchable volume hologram may include a nanovoided layer 140 having a complex three-dimensional structure. In some embodiments, the pattern of the nanovoided layer 140 representing the volume hologram may be determined before fabricating the three-dimensional structure of the nanovoided layer 140. For example, an interference pattern associated with the hologram may be determined, and then the nanovoided layer 140 may be designed to generate such a hologram, as will be further shown and described in connection with FIG. 5, below. This may be done, for example, by using radiation (e.g., polarized light, ultraviolet light, and/or other actinic radiation) that may influence an initiator used in conjunction with a curable material (e.g., a monomer) and a solvent to make the nanovoided layer 140. Further, a solvent may be used that dissolves the monomer but does not dissolve the polymer that may be formed from the monomer upon irradiation.

In particular, a homogenous mixture of the solvent and the monomer may be exposed to a first type of radiation (e.g., ultraviolet, UV, light) to trigger the initiator to create free radicals. The monomer may then polymerize to form a polymer. In another embodiment, the solubility parameter of the polymer may be different than the solubility parameter of the monomer, and therefore, the polymer may precipitate within a precursor mixture of materials (e.g., monomer, solvent, and initiator material). This may thereby generate dense regions of relatively high polymer concentration where the polymer tends to retract itself and excludes the solvent to neighboring regions, which may be utilized in the formation of nanovoided portions of the polymer during further curing.

In some embodiments, the formation of the nanovoided layer via the process described above may not only include providing a solution which is exposed to UV light to cause phase separations and thereby create nanovoids, but rather, may further include generating interference patterns using the radiation source (e.g., UV light) in the polymer. Accordingly, regions of high UV intensity and regions of low UV intensity may be provided in the polymer during exposure to UV light. Further, where a high intensity of UV light is provided, the initiator may be triggered, which may locally generate regions for the polymerization of the monomer, thereby excluding the solvent to the adjacent regions. When the polymer is cured and/or dried, nanovoids may be generated in those adjacent regions. The voids and/or nanovoids may be any suitable size and, in some embodiments, the voids may approach the scale of the thickness of the nanovoided material. For example, the voids may be between approximately 10 nm to about equal to the thickness of the nanovoided material. In some embodiments, the nanovoids may be between approximately 10 nm and approximately 1000 nm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 110 nm, approximately 120 nm, approximately 130 nm, approximately 140 nm, approximately 150 nm, approximately 160 nm, approximately 170 nm, approximately 180 nm, approximately 190 nm, approximately 200 nm, approximately 250 nm, approximately 300 nm, approximately 400 nm, approximately 500 nm, approximately 600 nm, approximately 700 nm, approximately 800 nm, approximately 900 nm, approximately 1000 nm).

In some embodiments, the monomers may be monofunctional or polyfunctional, or mixtures thereof. Polyfunctional monomers may be used as crosslinking agents to add rigidity or to form elastomers. Polyfunctional monomers may include difunctional materials such as bisphenol fluorene diacrylate, trifunctional materials such as trimethylolpropane triacrylate (TMPTA), or higher functional materials. Other types of monomers may be used, including isocyanates, and these may be mixed with monomers with different curing mechanisms.

In some embodiments, the solvent may have a vapor pressure that is similar to at least one of the monomers being evaporated. The solvent may dissolve both the monomer and the generated polymer (upon polymerization), or only the monomer. Alternatively, the solvent may have low solubility for the monomer, or monomers if there is a mixture of monomers being applied. Furthermore, the solvent may be immiscible with one or more of the monomer(s), and may at least partially phase separate when condensed on the substrate.

In some embodiments, incident light may be diffracted by the interference structure 100 (e.g., the hologram) at a particular angle (e.g., a Bragg angle). In another embodiment, if the hologram is illuminated with a light source incident at the original reference beam angle but having a broad spectrum of wavelengths, reconstruction of the hologram may occur at the wavelength of the original light source. If the angle of illumination is changed, reconstruction may occur at a different wavelength and the color of the reconstructed hologram may change.

Figure 1B:
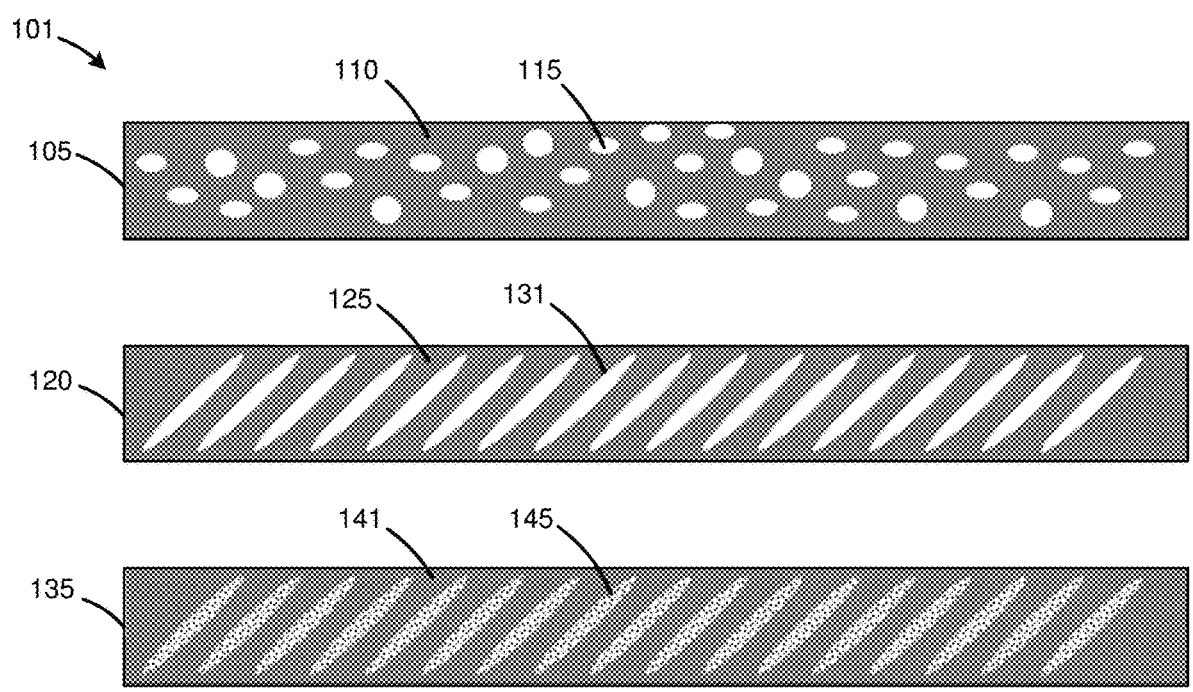
FIG. 1B shows side views of three different holographic structures, in accordance with example embodiments of the disclosure.

FIG. 1B shows three different holographic structures 101, in accordance with example embodiments of the disclosure. In at least one embodiment, the holographic structures 101 may form a portion of the nanovoided layer 140 of the interference structure 100 shown and described in connection with FIG. 1A above. In particular, holographic structure 105 shown in FIG. 1B illustrates a complex structure of a photopolymer 110 with nanovoided regions 115. Such a complex structure may be formed by, for example, the formation of an image in the holographic structure 105 by the interference of two or more interfering laser beams. In another embodiment, one of the beams may be formed by light scattered from an object.

In another embodiment, the holographic structure 120 shown in FIG. 1B may include a simpler structure in comparison with holographic structure 105, with the structure formed in a photopolymer 125 with voided regions 131. In a further embodiment, the holographic structures 101 may additionally or alternatively include voided and/or nanovoided regions having internal structure. For example, holographic structure 135 shown in FIG. 1B may include a photopolymer 141 with voided regions 145, where the voided regions 145 may themselves include smaller-scale nanovoided regions.

In various embodiments, the photopolymers of the holographic structures 101 may be fabricated by using a free-radical polymerizing monomer, including, for example, acrylate monomers. In one aspect, the acrylate monomers may be monofunctional, such as methyl methacrylate, ethyl methacrylate, methyl acrylate, and acrylic acid. In one aspect, the acrylates may also be polyfunctional, such as di-, tri-, or higher order functional acrylates. In another embodiment, the polyfunctional acrylates may be used to create crosslinked polymers. Combinations of monofunctional and polyfunctional acrylates may be used to create polymers with the desired properties. In another embodiment, a solvent may be mixed with the monomer(s), and alternatively with polymers and particles. In some embodiments, the solvent may be miscible with the monomers, and depending on the application, may dissolve, swell (partially dissolve), or be immiscible with the polymer. Further, the solvent may be removed by any suitable technique, such as by simply evaporation, or by first replacing the solvent with a different material, such as a non-solvent or by a supercritical carbon dioxide.

Figure 2:
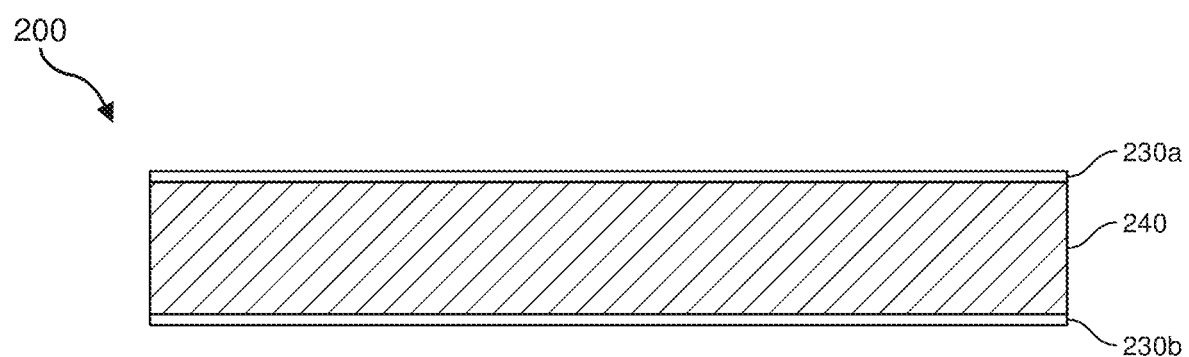
FIG. 2 shows a side view of an electroactive interference structure, in accordance with example embodiments of the disclosure.

FIG. 2 shows a diagram of an interference structure, in accordance with example embodiments of the disclosure. In particular, the interference structure 200 may include a holographic material (e.g., a volume holographic material) that may scatter incident light by a three-dimensional distribution of nanovoids in a nanovoided layer 240. In some embodiments, a volume hologram may refer to a hologram where the thickness of the recording medium (e.g., the nanovoided layer) may be greater than the spacing of the interference pattern in the recording medium. Moreover, a voltage may be applied between a first transparent conductor 230*a* and a second transparent conductor 230*b*. In some embodiments, incident light may have at least some wavelengths scattered by the nanovoided layer 240 forming reflected scattered rays and transmitted scattered rays (not shown).

As noted, in some embodiments, the interference structure 200 may include a switchable volume hologram. In another embodiment, the switchable volume hologram may include a nanovoided layer 240 having a complex three-dimensional structure. In some embodiments, the pattern of the nanovoided layer 240 representing the volume hologram may be determined before fabricating the three-dimensional structure of the nanovoided layer 240. For example, an interference pattern associated with the hologram may be determined, and then the nanovoided layer 240 may be designed to generate such a hologram, as will be further shown and described in connection with FIG. 5 below. This may be done, for example, by using radiation (e.g., polarized light, ultraviolet light, etc.) that may influence an initiator used in conjunction with a curable material (e.g., a monomer) and a solvent to make the nanovoided layer 240. Further, a solvent may be used that dissolves the monomer but does not dissolve the resulting polymer that may be formed from the monomer upon irradiation.

In particular, a homogenous mixture of the solvent and the monomer may be exposed to a first type of radiation (e.g., ultraviolet, UV, light) to trigger the initiator to create free radicals. The monomer may then polymerize to form a polymer. In another embodiment, the solubility parameter of the polymer may be different than the solubility parameter of the monomer, and therefore, the polymer may precipitate out of the matrix of materials (e.g., monomer, solvent, and initiator material). This may thereby generate dense regions of relatively high polymer concentration where the polymer tends to retract itself and excludes the solvent to neighboring regions, thereby leading to the formation of the nanovoided polymers.

In some embodiments, the formation of the nanovoided layers via the process described above may not only include providing a solution which is exposed to UV light to cause phase separations and thereby create voids (e.g., 50 to 100 nanometer wide voids), but rather, may further include generating one or more interference patterns using the radiation source (e.g., UV light) in the polymer. Accordingly, regions of high UV intensity and regions of low UV intensity may be provided in the polymer. Further, where a high intensity of UV light is provided, the initiator may be triggered, which may locally generate regions for the polymerization of the monomer, thereby excluding the solvent to the adjacent regions. When the polymer is cured and/or dried, nanovoids may be generated in those adjacent regions.

In some embodiments, the monomers may be monofunctional or polyfunctional, or mixtures thereof. Polyfunctional monomers may be used as crosslinking agents to add rigidity or to form elastomers. Polyfunctional monomers may include difunctional materials such as bisphenol fluorene diacrylate, trifunctional materials such as trimethylolpropane triacrylate (TMPTA), or higher functional materials. Other types of monomers may be used, including isocyanates, and these may be mixed with monomers with different curing mechanisms.

In some embodiments, the solvent may have a vapor pressure that is similar to at least one of the monomers being evaporated. The solvent may dissolve both the monomer and the generated polymer (upon polymerization), or only the monomer. Alternatively, the solvent may have low solubility for the monomer, or monomers if there is a mixture of monomers being applied. Furthermore, the solvent may be immiscible with one or more of the monomer(s), and may at least partially phase separate when condensed on the substrate.

In some embodiments, incident light may be diffracted by the interference structure 200 (e.g., the hologram) at a particular angle (e.g., a Bragg angle). In another embodiment, if the hologram is illuminated with a light source incident at the original reference beam angle but having a broad spectrum of wavelengths, reconstruction of the hologram may occur at the wavelength of the original light source. If the angle of illumination is changed, reconstruction may occur at a different wavelength, and the color of the reconstructed hologram may change.

In some embodiments, the nanovoided layer 140 and/or 240 may include electroactive polymers and/or elastomer materials. As used herein, "electroactive polymers" may refer to polymers that exhibit a change in size and/or shape when stimulated by an electric field. In some examples, an "electroactive polymer" may refer to a deformable polymer that may be symmetric with regard to electrical charge (e.g., polydimethylsiloxane (PDMS) acrylates, and the like) or asymmetric (e.g., poled polyvinylidene fluoride (PVDF) or its copolymers such as poly[(vinylidenefluoride-co-trifluoroethylene] (PVDF:TrFE)).

Some electroactive polymers may find limited application due to a low breakdown voltage of the polymers with respect to the operating voltage used by electroactive devices (e.g., reflectors) that use the polymers. Accordingly, electroactive devices with reduced operating voltages and higher energy densities may be useful for many applications. Additional examples of polymer materials forming electroactive polymer materials may include, without limitation, styrenes, polyesters, polycarbonates, epoxies, halogenated polymers, such as PVDF, copolymers of PVDF, such as PVDF-TrFE, silicone polymers, and/or any other suitable polymer materials. Such materials may have any suitable dielectric constant or relative permittivity, such as, for example, a dielectric constant ranging from approximately 2 to approximately 30.

In some embodiments, an "elastomer material" may refer to a polymer with viscoelasticity (i.e., both viscosity and elasticity) and relatively weak intermolecular forces, and generally low elastic modulus (a measure of the stiffness of a solid material) and high failure strain compared with other materials. In some embodiments, the nanovoided layer 140 may include an elastomer material that has an effective Poisson ratio of less than a predetermined value (e.g., less than approximately 0.35, less than approximately 0.3, less than approximately 0.2, or less than approximately 0.1). In at least one example, the elastomer material may have an effective density that is less than a predetermined value (e.g., less than approximately 90%, less than approximately 80%, less than approximately 60%, or less than approximately 40%) of the elastomer when densified (e.g., when the elastomer is compressed, for example, by electrodes (to be discussed further below) to make the elastomer denser). As noted, in some examples, the nanovoided layer may be nanovoided (e.g., having a plurality of nano-sized voids in the material) in at least a portion of the layer. In some embodiments, the nanovoids may be at least approximately 10% (alternatively, at least approximately 30%, at least approximately 50%, or at least approximately 70%) of the volume of the optically transparent materials.

In some examples, the term "effective density" may refer to a parameter that may be obtained using a test method where a uniformly thick layer of an optically transparent material (e.g., elastomer) may be placed between two flat and rigid circular plates. In some embodiments, the diameter of the optically transparent material being compressed may be at least 100 times the thickness the optically transparent material. The diameter of the optically transparent material may be measured, then the plates may be pressed together to exert a pressure of at least approximately $1 \times 10^6$ Pa on the optically transparent material, and the diameter of the optically transparent material may be remeasured. The effective density may be determined from the following expression: D_ratio=D uncompressed/D_compressed, where D_ratio may represent the effective density ratio, D_uncompressed may represent the density of the uncompressed optically transparent material, and D_compressed may represent the density of the uncompressed optically transparent material.

In some embodiments, some of the nanovoided layer 140 may include nanovoided polymer materials that may include thermoplastic polymers. Suitable polymers may include, but are not limited to, polyolefins, such as, for example, polyethylene homopolymers and copolymers, polypropylene, polypropylene homopolymers and copolymers, functionalized polyolefins, polyesters, poly(ester-ether), polyamides, including nylons, poly(ether-amide), polyether sulfones, fluoropolymers, polyurethanes, and mixtures thereof. Polyethylene homopolymers include those of low, medium or high density and/or those formed by high-pressure or low-pressure polymerization. Polyethylene and polypropylene copolymers include, but are not limited to, copolymers with C4-C8 alpha-olefin monomers, including 1-octene, 1-butene, 1-hexene, and 4-methyl pentene.

Other non-limiting examples of suitable olefinic polymeric compositions for use as the nanovoided polymer materials include olefinic block copolymers, olefinic random copolymers, polyurethanes, rubbers, vinyl arylenes, and conjugated diener, polyesters, polyamides, polyethers, polyisoprenes, polyneoprenes, copolymers of any of the above, and mixtures thereof.

Examples of suitable copolymers for use as the nanovoided polymer materials include, but are not limited to, copolymers such as poly(ethylene-butene), poly(ethylene-hexene), poly(ethylene-octene), poly(ethylene-propylene), poly(ethylene-vinylacetate), poly(ethylene-methylacrylate), poly(ethylene-acrylic acid), poly(ethylene-butylacrylate), poly(ethylene-propylenediene), poly(methyl methacrylate), and/or polyolefin terpolymers thereof.

In some embodiments, the nanovoided polymer materials may include elastomeric polymers, including styrenic block copolymers, elastomeric olefinic block copolymers, and combinations thereof. Non-limiting examples of suitable styrenic block copolymers (SBC's) include styrene-butadiene-styrene (SBS), styrene-isoprene-styrene (SIS), styrene-ethylene-butylene-styrene (SEBS), styrene-ethylene-propylene (SEP), styrene-ethylene-propylene-styrene (SEPS), styrene-ethylene-ethylene-propylene-styrene (SEEPS) block copolymer elastomers, polystyrene, and/or mixtures thereof. In one embodiment, the film may include styrene-butadiene-styrene, polystyrene, and/or mixtures thereof.

The nanovoided polymer materials may further include optional components, such as fillers, plasticizers, compatibilizers, draw down polymers, processing aids, anti-blocking agents, viscosity-reducing polymers, and the like. Other additives may include pigments, dyes, antioxidants, antistatic agents, slip agents, foaming agents, heat or light stabilizers, UV stabilizers, and the like.

In some embodiments, the nanovoided layer 140 may have a thickness of approximately 10 nm to approximately 10 µm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 200 nm, approximately 300 nm, approximately 400 nm, approximately 500 nm, approximately 600 nm, approximately 700 nm, approximately 800 nm, approximately 900 nm, approximately 1 µm, approximately 2 µm, approximately 3 µm, approximately 4 µm, approximately 5 µm, approximately 6 µm, approximately 7 µm, approximately 8 µm, approximately 9 µm, approximately 10 µm), with an example thickness range of approximately 200 nm to approximately 500 nm.

As noted, in some embodiments, the nanovoided layer 140 may include particles of a material having a high dielectric constant, the particles having an average diameter between approximately 10 nm and approximately 1000 nm. In some embodiments, the material having the high dielectric constant may include barium titanate, $BaTiO_3$), which is a member of the perovskite family and which may also include other titanates. Additionally or alternatively, any other suitable component may be added to the electroactive polymer material. $BaTiO_3$ is a ferroelectric material with a relatively high dielectric constant (e.g., a value of between approximately 500 and approximately 7000) and polarization and may be used in various electroactive devices described herein. Besides large polarizability and permittivity, large strains may also be achievable with $BaTiO_3$. Pure $BaTiO_3$ may be an insulator whereas, upon doping it, may transform into a semiconductor in conjunction with the polymer material. In some embodiments, the particles of the materials having a high dielectric constant may be included in the polymer to modify a mechanical (e.g., a Poisson's ratio) or electrical property (resistance, capacitance, etc.) of the nanovoided materials.

In various embodiments, the first transparent conductor 230a and/or the second transparent conductor 230b shown in FIG. 2 may be configured in any suitable manner. For example, in some embodiments, the first transparent conductor 230a and/or the second transparent conductor 230b may be formed from a thin film of electrically conductive and semi-transparent material, such as indium tin oxide (ITO). In some implementations, alternatives to ITO may be used, including wider-spectrum transparent conductive oxides (TCOs), conductive polymers, metal grids, carbon nanotubes (CNT), graphene, nanowire meshes, and thin-metal films. Additional TCOs may include doped binary compounds, such as aluminum-doped zinc-oxide (AZO) and indium-doped cadmium-oxide. Moreover, TCOs may include barium stannate and metal oxides, such as strontium vanadate and calcium vanadate. In some implementations, conductive polymers may be used. For example, a poly(3, 4-ethylenedioxythiophene) poly(styrene sulfonate) (PEDOT:PSS) layer may be used. In another example, a poly (4,4-dioctyl cyclopentadithiophene) material doped with iodine or 2,3-dichloro-5,6-dicyano-1,4-benzoquinone (DDQ) may be used. The example polymers and similar materials may be spin-coated in some example embodiments.

Further, the first transparent conductor 230a and/or the second transparent conductor 230b may include any suitable material such as electrically conductive materials suitable for use in thin-film electrodes, such as, for example, aluminum, silver, indium, gallium, zinc, carbon black, and/or any other suitable materials formed by vacuum deposition, spray, adhesion, and/or any other suitable technique. In some embodiments, the first transparent conductor 230a and/or the second transparent conductor 230b may be self-healing, such that damage from local shorting of a circuit may be isolated. Suitable self-healing electrodes may include thin films of metals, such as aluminum. In some configurations, it may be necessary for the first transparent conductor 230a and/or the second transparent conductor 230b to stretch elastically. In such embodiments, the first transparent conductor 230a and/or the second transparent conductor 230b may include TCOs, graphene, carbon nanotubes, and the like. In some embodiments, the first transparent conductor 230a and/or the second transparent conductor 230b may have a thickness of approximately 1 nm to approximately 500 nm, with an example thickness of approximately 10 nm to approximately 100 nm. In one aspect, the first transparent conductor 230a and/or the second transparent conductor 230b may be designed to allow healing of electrical breakdown (e.g., the electric breakdown of the nanovoided materials in nanovoided layer 240).

In some embodiments, the first transparent conductor 230a and/or the second transparent conductor 230b may be fabricated using any suitable process. For example, the first transparent conductor 230a and/or the second transparent conductor 230b may be fabricated using PVD, CVD, sputtering, spray-coating, spin-coating, ALD, and the like. In another embodiment, the first transparent conductor 230a and/or the second transparent conductor 230b may be manufactured using a thermal evaporator, a sputtering system, a spray coater, a spin-coater, an ALD unit, and the like.

Figure 3:
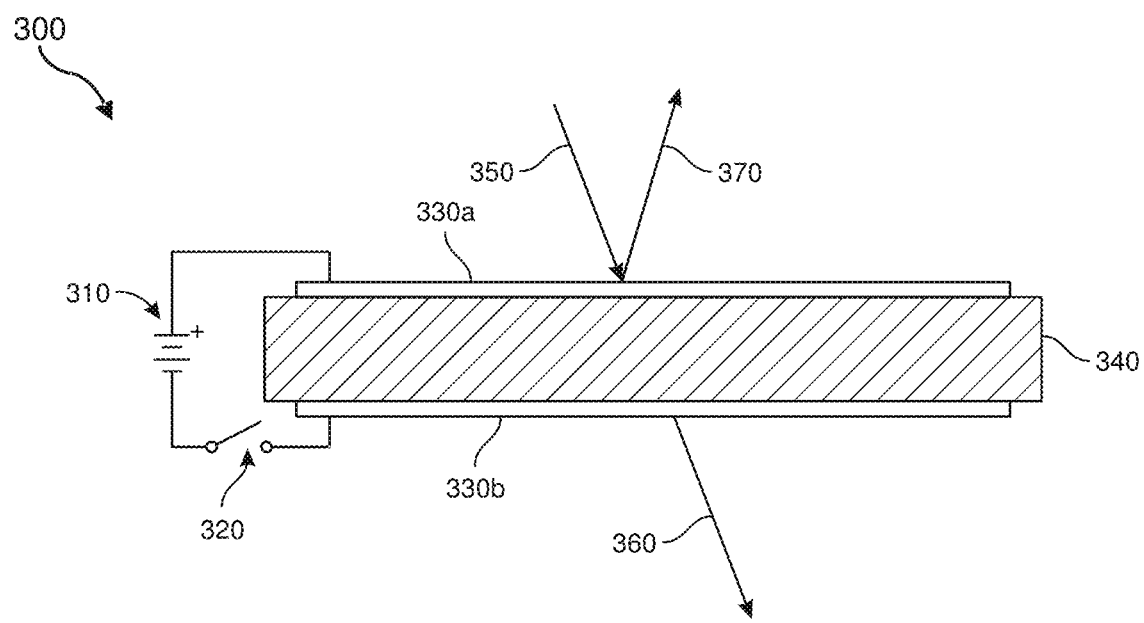
FIG. 3 shows another diagram of an electroactive interference structure in an uncompressed state, in accordance with example embodiments of the disclosure.

FIG. 3 shows a diagram of an interference structure that includes a device 300, in accordance with example embodiments of the disclosure. In particular, as noted, the device 300 may include a holographic material (e.g., a volume holographic material) that may scatter incident light 350 by a three-dimensional distribution of nanovoids in a nanovoided layer 340. Further, a voltage source 310 may be connected to the device 300 and may be controlled (e.g., turned on and turned off) by a switch 320, which is turned off in the device 300 shown in FIG. 3. Moreover, the voltage may be applied between a first transparent conductor 330a and a second transparent conductor 330b. In some embodiments, incident light 350 may have at least some wavelengths scattered by the nanovoided layer 340 forming reflected scattered rays 370 and transmitted scattered rays 360. The angle of the transmitted scattered rays 360 and reflected scattered rays 370 with respect to the surface of the nanovoided layer 340 may be complex (e.g., including structured light patterns, images, and the like).

In some embodiments, incident light may be diffracted by the device 300 (e.g., the hologram) at a particular angle (e.g., a Bragg angle). In another embodiment, if the hologram is illuminated with a light source incident at the original reference beam angle but having a broad spectrum of wavelengths, reconstruction of the hologram may occur at the wavelength of the original light source. If the angle of illumination is changed, reconstruction may occur at a different wavelength, and the color of the reconstructed hologram may change. In some embodiments, light rays may be partially transmitted and/or partially reflected in a similar manner from an optical structure that does not include transparent conductors, such as holographic structure 101 in FIG. 1A.

Figure 4:
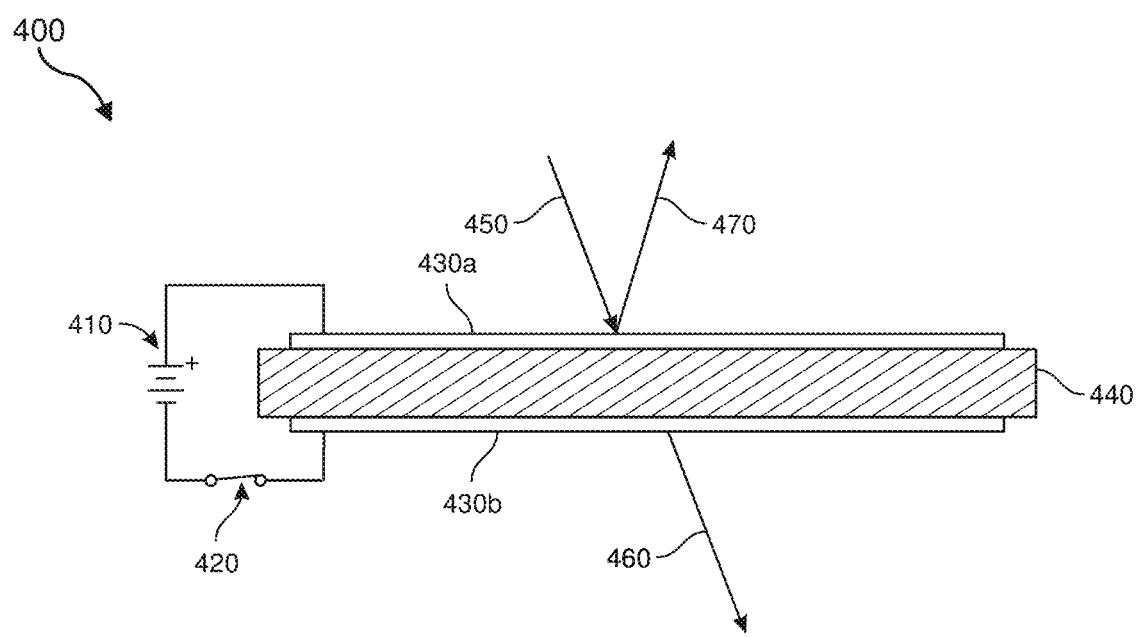
FIG. 4 shows a diagram of the electroactive interference structure of FIG. 3 in a compressed state, in accordance with example embodiments of the disclosure.

FIG. 4 shows a diagram of an interference structure that includes a device 400 in a compressed state, in accordance with example embodiments of the disclosure. In particular, FIG. 4 shows the device 400 which is similar to that of the device 300 as shown in FIG. 3; however, in FIG. 4 switch 420 of voltage source 410 is turned on, thereby generating a voltage difference between first transparent conductor 430a and second transparent conductor 430b. This voltage difference may serve to compress the nanovoids in the nanovoided layer 440, which may reduce the refractive index difference between the nanovoided and non-nanovoided regions of the layer 440. Accordingly, this compression of the nanovoided layer 440 may change the degree of interference created by the nanovoided layer 440. In some embodiments, as the compression of the nanovoided layer 440 increases, the degree of interference may cause the nanovoided layer 440 to reduce the amount of interference of the incident light (e.g., to nearly zero interference). In some embodiments, light rays may be partially transmitted and/or partially reflected in a similar manner from an optical structure that does not include transparent conductors, such as holographic structure 101 in FIG. 1A.

Figure 5:
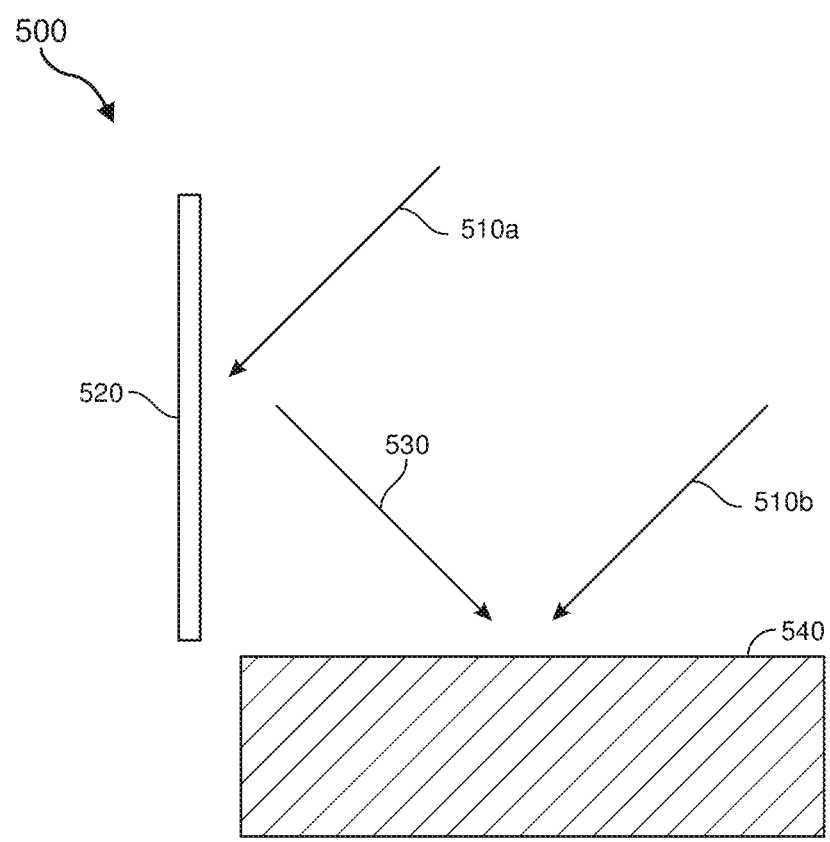
FIG. 5 illustrates aspects of light interference that may be used to generate an interference structure as it relates to the exemplary devices, in accordance with example embodiments of the disclosure.

FIG. 5 illustrates aspects of interference as it relates to the formation of the exemplary devices disclosed herein. In particular, first coherent light (e.g., first laser light) 510a may be incident on an interference-generating structure 520 (e.g., an object or a film with a predetermined pattern or arrangement of features to be generated in a hologram). In at least one embodiment, the incident light 510a reflects off the interference generating structure 520 to generate reflected light 530. Further, the reflected light 530 may then interfere with a second coherent light 510b (e.g., second laser light) on a curable monomer 540. In one aspect, the first coherent light (e.g., first laser light) 510a and the second coherent light 510b (e.g., second laser light) may be separated using a beam splitter that divides an original common beam into two identical beams, each aimed in different directions to generate the interference. The interference of the reflected light 530 and the second coherent light 510b may create an interference pattern in the curable monomer 540, thereby generating a volume hologram (e.g., a recorded light pattern that may represent the diffraction grating).

In another embodiment, the exposure time of the curable monomer 540 to the first coherent light 510a (e.g., first laser light), reflected via the interference generating structure 520 as reflected light 530, and the second coherent light 510b (e.g., second laser light) may be controlled to generate the volume hologram from the curable monomer 540. In one aspect, the interference generating structure 520 may be an amplitude modulation hologram where the amplitude of light diffracted by the hologram is proportional to the intensity of the resulting light including the interference pattern arising from interference between the first coherent light 510a (e.g., first laser light) and the second coherent light 510b (e.g., second laser light). In another embodiment, the interference generating structure 520 may be a phase hologram where the refractive index of the material is modulated in proportion to the intensity of the interference pattern. In another embodiment, the interference generating structure 520 may include any suitable material that is able to fully resolve all or substantially all of the fringes arising from interference between the first coherent light 510a and the second coherent light 510b. Fringe spacings of the interference pattern can range from tens of micrometers to less than one micrometer (i.e., spatial frequencies ranging from a few hundred to several thousand cycles/mm), and the curable monomer 540 may have a response that may be relatively flat over this range.

In another embodiment, the interference pattern may be formed by applying a layer of monomer and solvent on a reflective substrate and exposing the coating to coherent or semicoherent light. The light reflecting from the reflective substrate can interfere with the incoming light and form an interference pattern. The light may be at a normal incidence angle to the reflective substrate, or it may be at a non-normal angle. There may be one, two, or more coherent or semicoherent beams of light forming the desired interference pattern. The reflective substrate may be a metal coating, for example, silver or aluminum, or a reflective dielectric coating.

Figure 6A:
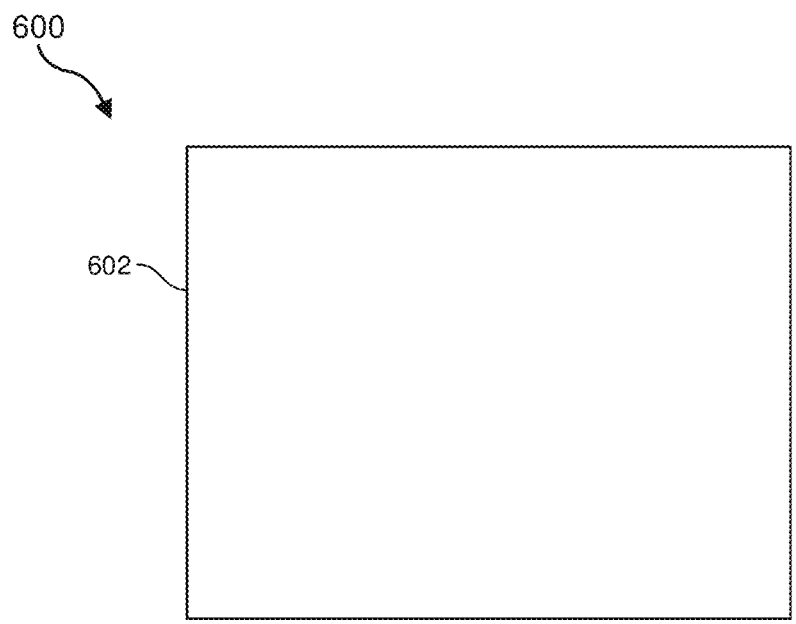
FIG. 6A illustrates a precursor mixture for forming an interference structure, in accordance with example embodiments of the disclosure.

FIGS. 6A-6D show diagrams illustrating aspects of the formation of an interference pattern, in accordance with example embodiments of the disclosure. In particular, FIG. 6A shows a diagram 600 of a precursor mixture 602. In another embodiment, the precursor mixture 602 may include at least one monomer (e.g., acrylates or any type of photo-initiable monomer), at least one initiator (e.g., molecules including vinyl, azo, and peroxide groups), and at least one solvent. In some examples, the precursor mixture 602 may be disposed on a substrate (not shown). Further, the precursor mixture 602 may include thermoplastic polymers, as described in connection with FIG. 1A, above.

In some embodiments, the precursor mixture 602 may include one or more monomers that may be monofunctional, polyfunctional, or mixtures thereof. Polyfunctional monomers may be used as crosslinking agents to add rigidity or to form elastomers. Polyfunctional monomers may include difunctional materials such as bisphenol fluorene diacrylate, trifunctional materials such as trimethylolpropane triacrylate (TMPTA), or higher functional materials. Other types of monomers may be used, including isocyanates, and these may be mixed with monomers with different curing mechanisms.

In another embodiment, the precursor mixture 602 may include a free-radical polymerizing monomer, including, for example, one or more acrylate monomers. In one aspect, the acrylate monomers may be monofunctional, such as methyl methacrylate, ethyl methacrylate, methyl acrylate, and acrylic acid. In one aspect, the acrylates may also be polyfunctional, such as di-, tri-, or higher order functional acrylates. In another embodiment, the polyfunctional acrylates may be used to create crosslinked polymers. Combinations of monofunctional and polyfunctional acrylates may be used to create polymers with the desired properties.

In another embodiment, the precursor mixture 602 may include a solvent that may be mixed with the monomer(s), and alternatively with polymers and particles. In another embodiment, the solvent may have low solubility for the monomer(s). In some embodiments, the solvent may be miscible with the monomers, and depending on the application, may dissolve, swell (partially dissolve), or be immiscible with the polymer. In some examples, the solvent may be removed in further processing to be described below, by any suitable technique, such as by simply evaporation, or by first replacing the solvent with a different material, such as a non-solvent or by a supercritical carbon dioxide.

The precursor mixture 602 may also include a surfactant. The surfactant may provide better compatibility between the polymer and monomer, or between the polymer and the solvent. Alternatively, or in addition, the surfactant may reduce the surface energy of the voids, which can reduce adhesive forces when the voids are compressed.

As noted, in some embodiments, the precursor mixture 602 may include particles of a material having a high dielectric constant, the particles having an average diameter between approximately 10 nm and approximately 1000 nm. In some embodiments, the material having the high dielectric constant may include barium titanate, $BaTiO_3$), which is a member of the perovskite family and which may also include other titanates.

The precursor mixture 602 may further include optional components, such as fillers, plasticizers, compatibilizers, draw down polymers, processing aids, anti-blocking agents, viscosity-reducing polymers, and the like. Other additives may include pigments, dyes, antioxidants, antistatic agents, slip agents, foaming agents, heat or light stabilizers, UV stabilizers, and the like.

Figure 6B:
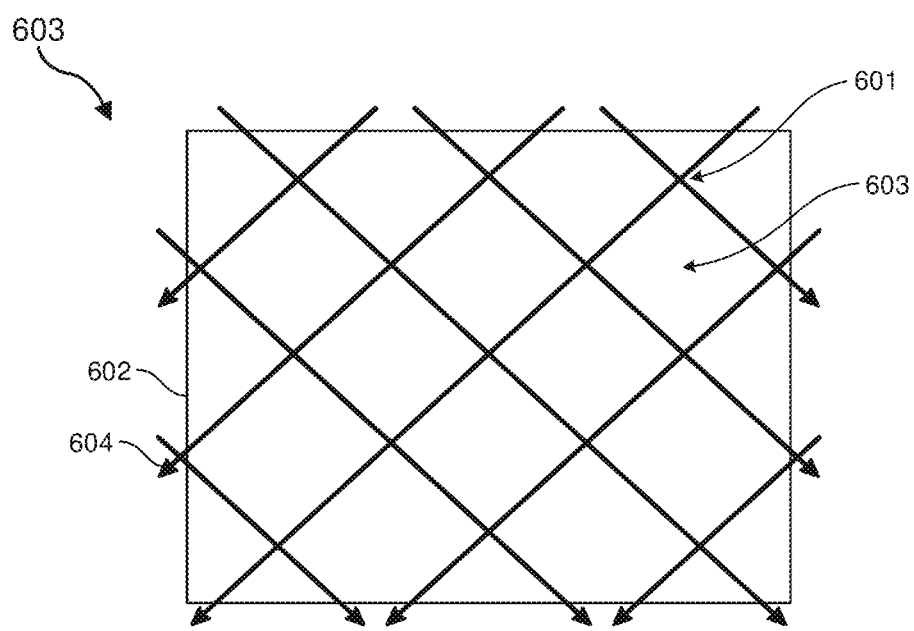
FIG. 6B illustrates the precursor mixture of FIG. 6A exposed to an interference pattern of incident light, in accordance with example embodiments of the disclosure.

FIG. 6B shows a diagram 603 illustrating exposure of the precursor mixture 602 to an interference pattern 604 of light generated within the precursor mixture 602. In some embodiments, the precursor mixture 602 may irradiated with two or more sources of coherent light (not shown) spaced apart from each other and shining on the same general region of the mixture to generate an interference pattern in the precursor mixture 602. In another embodiment, the exposure time of the precursor mixture 602 to a first coherent light (e.g., first laser light) and a second coherent light (e.g., second laser light) may be controlled to generate a volume hologram from the precursor mixture 602.

In particular, the precursor mixture 602 including the solvent and the monomer may be exposed to a first type of radiation (e.g., ultraviolet, UV, light) that forms the interference pattern 604 to trigger the initiator to create free radicals. As shown in FIG. 6B, the interference pattern 604 may have regions 601 of constructive interference and regions 603 of destructive interference between the regions 601 of constructive interference. The monomer may selectively polymerize to form a polymer at and/or around the regions 601 of constructive interference. In some embodiments, the solubility parameter of the polymer may be different than the solubility parameter of the monomer, and therefore, the polymer may precipitate and exclude non-polymerized components of the precursor mixture 602 (e.g., monomer, solvent, and initiator material) to regions outside of the regions 601 of constructive interference. This may thereby generate dense regions of relatively high polymer concentration at the regions 601 of constructive interference where the polymer solidifies and exclude the solvent to neighboring regions between the regions 601 of constructive interference such that the precipitated polymer is located at and/or around the regions 601 of constructive interference and is suspended in the surrounding precursor mixture 602.

Figure 6C:
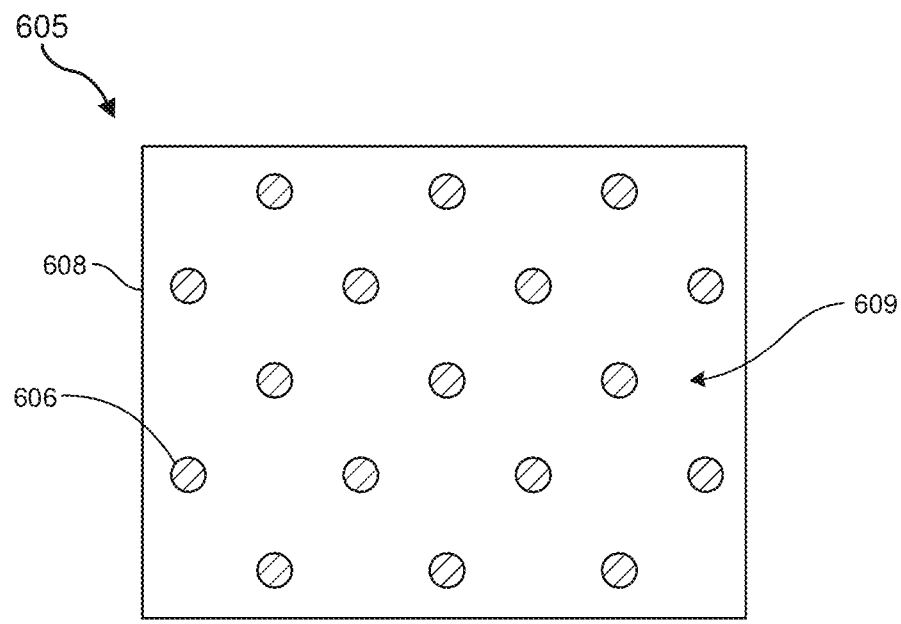
FIG. 6C illustrates polymerization of portions of the precursor mixture of FIG. 6B, in accordance with example embodiments of the disclosure.

FIG. 6C shows a diagram 605 illustrating the formation of an intermediate material 608 having an array (e.g., a three-dimensional array) of higher-density polymerized regions 606 suspended in a precursor mixture 609. In some embodiments, exposure of the precursor mixture 602 to the interference pattern 604 described in connection with FIG. 6B above may lead to the selective polymerization of monomers in and/or near regions 601 of the precursor mixture 602 where there is constructive interference of light, thereby producing an ordered matrix of higher-density polymerized regions 606 suspended in the surrounding non-polymerized and/or partially-polymerized precursor mixture 609. In some embodiments, regions 601 of higher radiation (e.g., UV light) intensity and regions of lower radiation intensity between the regions 601 may be provided in the mixture due to the interference pattern 604. Further, where a higher intensity of UV light is provided at the regions 601 of constructive interference, an initiator in the precursor mixture 602 may be triggered, which may locally generate conditions for the polymerization of the monomer, thereby excluding the solvent to the adjacent regions between the regions 601 of constructive interference due to the immiscibility of the resultant polymer in the solvent. Such adjacent regions surrounding the higher-density polymerized regions 606 shown in FIG. 6C may include the precursor mixture 609, which may have a lower monomer concentration and a higher solvent concentration than precursor mixture 602 shown in FIGS. 6A and 6B due to the polymerization and precipitation of portions of the monomer during the formation of the higher-density polymerized regions 606.

Figure 6D:
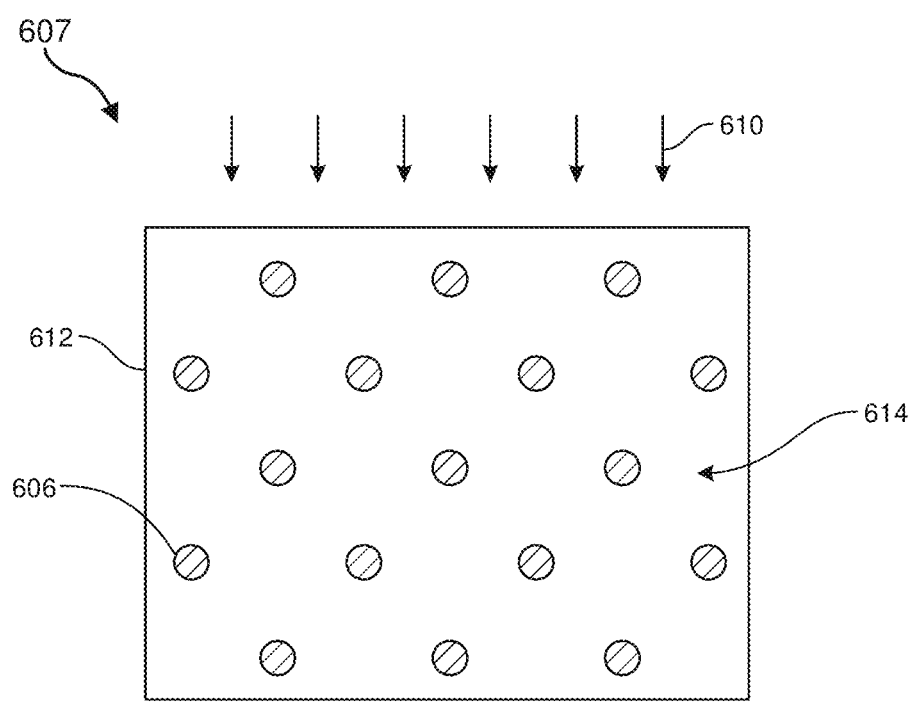
FIG. 6D illustrates polymerization of remaining portions of the precursor mixture of FIG. 6C to form an interference structure, in accordance with example embodiments of the disclosure.

FIG. 6D shows a diagram 607 illustrating a second irradiation 610 of the intermediate material 608 of FIG. 6C to form an interference structure 612. Following the formation of the higher-density polymerized regions 606 illustrated in FIG. 6C, the remaining precursor mixture 609 may be cured and/or dried to form a lower-density polymer that may include nanovoids in regions outside of the higher-density polymerized regions 606. In at least one embodiment, the irradiation 610 may include radiation emitted from an actinic radiation source (e.g., ultraviolet light, infrared radiation, and the like), which can be used to cure the precursor mixture 609 of FIG. 6C to form lower-density polymerized regions 614 as shown in FIG. 6D. The lower-density polymerized regions 614 may surround the higher-density polymerized regions 606. In some examples, the higher-density polymerized regions 606 and/or the lower-density polymerized regions 614 may have density gradients. For example, the higher-density polymerized regions 606 and/or the lower-density polymerized regions 614 may have gradients that proceed from increased densities (i.e., higher polymer density) at locations at and/or near the regions 601 of constructive interference shown in FIG. 6B to reduced densities (i.e., lower polymer density) at and/or near the regions 603 of destructive interference and/or other locations between the regions 601 of constructive interference.

In some embodiments, during curing of the precursor mixture 609, nanovoids (e.g., voids having average diameters of from approximately 10 to approximately 1000 nm) may be formed as the monomers in the precursor mixture 609 polymerize and exclude the solvent into adjacent regions. In certain examples, the higher-density polymerized regions 606 may be free or substantially free of nanovoids. Additionally or alternatively, the higher-density polymerized regions 606 may include nanovoids at a lower concentration (i.e., a lower vol %) than the lower-density polymerized region 614; such nanovoids in the higher-density polymerized regions 606 may be formed, for example, during exposure of the precursor mixture 602 to the interference pattern 604 as shown in FIG. 6B. In some embodiments, the solvent in the nanovoids may be at least partially removed (e.g., via evaporation) from the nanovoids of interference structure 612 shown in FIG. 6D.

Figure 7:
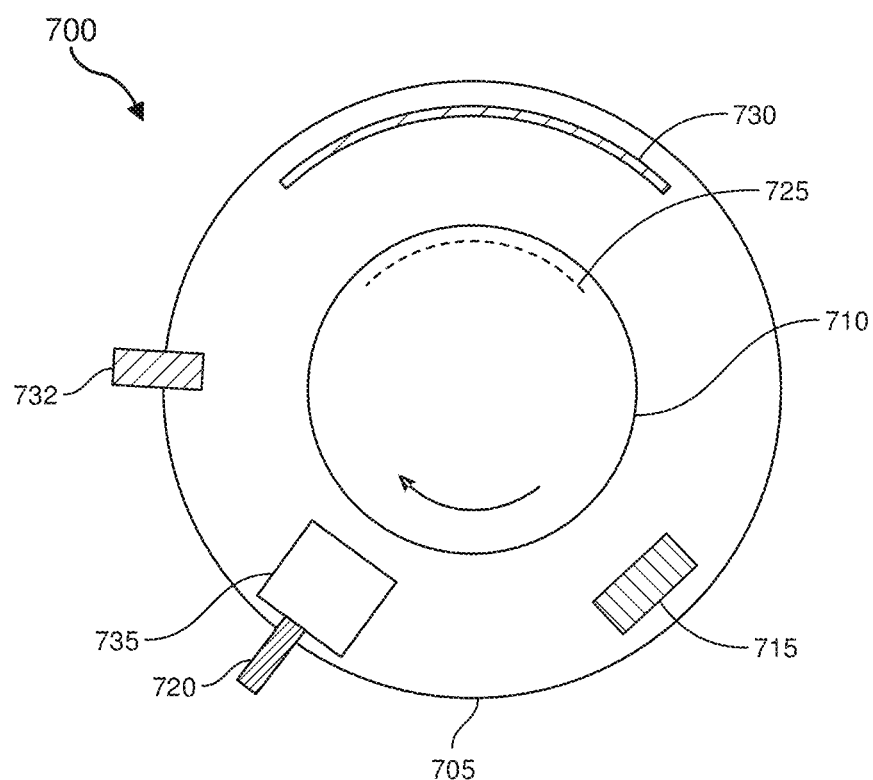
FIG. 7 shows a diagram of an example apparatus for fabricating an interference structure, in accordance with example embodiments of the disclosure.

FIG. 7 shows a diagram including an apparatus that may be used for making portions of an interference structure, in accordance with example embodiments of the disclosure. In particular, the apparatus 700 may include a vacuum-based deposition apparatus including an enclosure (alternatively referred to as a chamber) 705, a rotating drum 710, a heat source 725, an optional condenser 730, an optional source 715, a fluid source 720, and a curing source 732. As will be elaborated on further below, at least portions of an electronic device (e.g., a switchable interference structure including a nanovoided material) may be fabricated by alternating (i) depositions of solvent and a nanovoid matrix material (e.g., acrylate) and (ii) heated evaporation of the solvent to create the nanovoided regions.

In some embodiments, the fluid source 720 may include be a fluid that may have both a monomer (e.g., acrylic acid) and an optional crosslinking agent (e.g., trimethylolpropane triacrylate, TMPTA). In some examples, "monomer" may refer to a monomer that forms a given polymer (i.e., as part of a nanovoided material). In another embodiment, the fluid from the fluid source 720 may flow into the heat source 725, creating vapor of the monomer and crosslinker. This vapor may condense on a surface (e.g., on a substrate 130 or on a first transparent conductor 230a) on the rotating drum 710 to form a nanovoided layer 140 or 240 (see FIGS. 1A and 2). Subsequent layers (e.g., second transparent conductor 230b) may be similarly generated. Between depositions of layers or after deposition of layers, the partially or fully fabricated electroactive device (e.g., switchable interference structure) may be cured by the curing source 732. Further, after the deposition and/or curing, the electroactive device may be coated with a material by an optional source 715. For example, the optional source may apply a metal coating and/or a metal oxide coating, or combinations thereof (e.g., serving as a second transparent conductor 230b of FIG. 2), as discussed above. In some embodiments, there may be more than one optional source in addition to optional source 715.

In some embodiments, the apparatus 700 may use shadow masks to control the patterns of deposited materials to form the electroactive device. In some embodiments, the chamber 705 may be evacuated (e.g., using one or more mechanical vacuum pumps to a predetermined level such as $10^{-6}$ Torr or below). The chamber 705 may include a rigid material (e.g., steel, aluminum, brass, glass, acrylic, and the like). As noted, FIG. 7 shows an embodiment where the apparatus 700 may include a rotating drum 710. In some embodiments, the rotation of the rotating drum 710 may generate centrifugal energy and cause the deposited material to spread more uniformly over any underlying sequentially deposited materials (e.g., conductors, nanovoided layers, and the like) that are mechanically coupled to the rotating drum 710. Alternatively, the rotating drum 710 may be configured to be fixed in position and the deposition and curing systems (e.g., monomers in the fluid source 720 and an evaporator 735, the optional source 715, and/or curing source 732) may be moving, or both the rotating drum 710 and the deposition and curing systems may be moving simultaneously.

In some embodiments, the curing source 732 may include an energized array of filaments or other radiation source that may generate actinic energy to initiate reaction between the monomers, monomer initiators, and/or cross-linking agents. In some examples, "actinic energy" may refer to energy capable of breaking covalent bonds in a material. Examples may include electrons, electron beams, x-rays, gamma rays, ultraviolet, and visible light at appropriately high energy levels, and ions. Additionally or alternatively, the heat source 725 may generate heat to initiate reaction between the monomers, monomer initiators, and/or the cross-linking agents. The monomers, monomer initiators, and/or crosslinking agents may react upon heating and/or actinic exposure to form the nanovoided layer.

In some embodiments, an exhaust port (not shown) of the chamber 705 may open to release at least a portion of the vapor in chamber 705 between one or more depositions of the materials (e.g., monomers, crosslinking agents, initiators, conductive materials, etc.). In another embodiment, chamber 705 may be purged (e.g., with a gas or the application of a vacuum, or both), to remove a portion of the vapor (e.g., monomers, crosslinking agents, metal particles, and any resultant byproducts). Thereafter one or more of the previous steps may be repeated, as described above. In this way, individual layers of an electroactive device may be maintained at high purity levels.

In some embodiments, the deposition of the materials (e.g., monomers, crosslinking agents, conductive materials, etc.) of the electroactive device may be performed using a deposition process, such as chemical vapor deposition (CVD), to be described further below. CVD may refer to a vacuum deposition method used to produce high-quality, high-performance, solid materials. In CVD, a substrate may be exposed to one or more precursors, which may react and/or decompose on the substrate surface to produce the desired deposit (e.g., one or more transparent conductors, nanovoided layer, etc.). Frequently, volatile by-products are also produced, which may be removed by gas flow through the chamber 705.

As noted above, a flowable material (e.g., a solvent) may be combined with the curable materials (e.g., monomers) to create a flowable mixture that may be used for producing nanovoided layers including electroactive polymers (e.g., elastomers). In some embodiments, the flowable material may be combined (e.g., mixed) with the curable material (e.g., monomers). In some embodiments, the curable material itself may be combined with at least one non-curable component (e.g., particles of a material having a high dielectric constant and/or initiators) to form a mixture including the curable material and the at least one non-curable component. Alternatively, the flowable material (e.g., solvent) may be introduced into the fluid source 720 to deposit (e.g., via vaporization using the evaporator 725 or, in alternative embodiments, via printing) the curable material onto the conductor. In some embodiments, the flowable material (e.g., solvent) may be deposited as a separate layer either on top or below a curable material (e.g., a monomer), and the solvent and curable material may be allowed to diffuse into each other before being cured by the curing source 732 and/or heat source 725 to generate a nanovoided material. In some embodiments, after the curable material is cured, the solvent may be allowed to evaporate before another nanovoided material or another conductor is formed. In some embodiments, the evaporation of the solvent may be accelerated by the application of actinic energy by curing source 732, by application of heat to the substrate (not shown) by heat source 725, or by reducing the pressure of the solvent above the substrate using a condenser 730 (e.g., a device that condenses vapors into a liquid or solid), or a combination thereof. Isolators (not shown) may be added to the apparatus 700 to prevent, for example, the solvent vapor from interfering with the curing source, the condenser 730, or the optional source 715.

Figure 8:
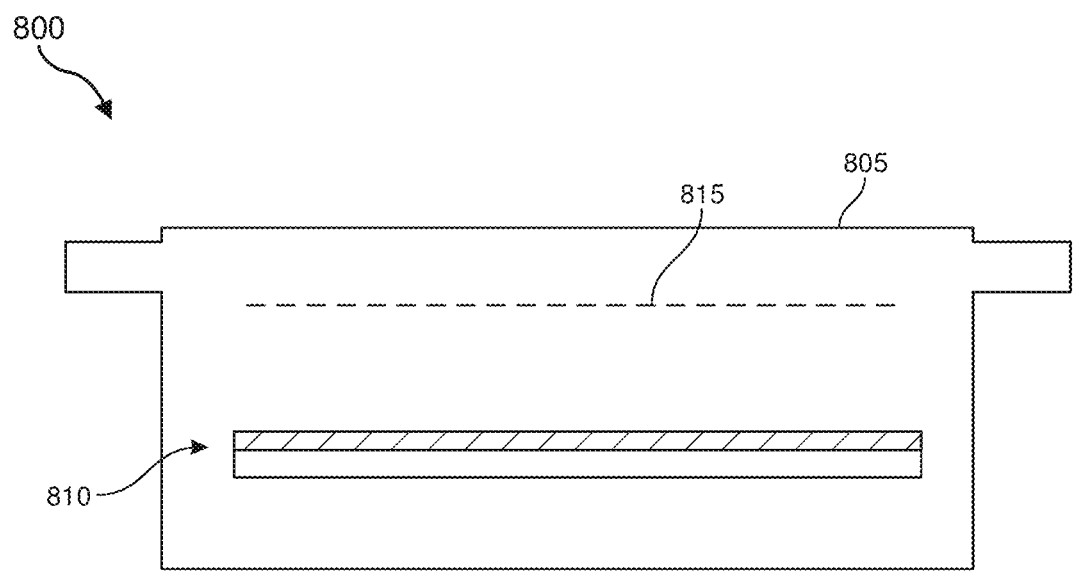
FIG. 8 shows diagram of another example apparatus for fabricating an interference structure and devices described herein, in accordance with example embodiments of the disclosure.

FIG. 8 shows another diagram of an example apparatus for the fabrication of the interference structure, in accordance with example embodiments of the disclosure. In particular, diagram 800 shows an apparatus 805 that may perform an initiated chemical vapor deposition (CVD) process. In another embodiment, in iCVD, an electric cooler (not shown) may be used to cool a substrate 810, and a mixture of, for example, an acrylate and a solvent vapor may be flowed into apparatus 805. This mixture may pass through an array of heated elements 815 that may be located in an upper portion of the apparatus 805. In at least one embodiment, the heated elements 815 may be heated to an elevated temperature, such as, for example, about 200° C., which may trigger an initiator. The substrate 810 may be concurrently cooled to a temperature below that of the heated elements. Accordingly, a mixture of solvent and monomer may condense on the surface of the substrate 810, where it may be cured. Alternatively or additionally, multiple layers of monomer and solvent-monomer mixture may be alternately deposited. The layers may be stacked through, for example, sequential deposition, and the solvent may be removed (e.g., through evaporation by heating) to generate a nanovoided structure. In another embodiment, relatively precise control of the temperature of the substrate and the multilayer deposited structure may be used to generate a high-quality switchable device. For example, active cooling may be used. In at least one embodiment, Henry's law may be used to infer that minor fluctuations of the low-pressure environment (e.g., the pressure of the chamber) will likely not substantially affect the vapor pressure of the solvent and may therefore not negatively impact the quality, structure, and/or uniformity of the nanovoided materials.

In some embodiments, the apparatus 805 may apply an atmospheric pressure CVD (APCVD) coating formation technique (e.g., CVD at atmospheric pressure). In another embodiment, the apparatus 805 may apply a low-pressure CVD (LPCVD) process (e.g., CVD at sub-atmospheric pressures). In some embodiments, LPCVD may make use of reduced pressures that may reduce unwanted gas-phase reactions and improve the deposited material's uniformity across the substrate. In one embodiment, the apparatus 805 may apply an ultrahigh vacuum CVD (UHVCVD) process (e.g., CVD at very low pressure, typically below approximately $10^{-6}$ Pa (equivalently, approximately $10^{-8}$ torr)).

In some embodiments, the apparatus 805 may apply an aerosol-assisted CVD (AACVD) process (e.g., a CVD in which the precursors are transported to the electroactive device) by means of a liquid/gas aerosol, which may be generated ultrasonically. In some embodiments, AACVD may be used with non-volatile precursors.

In some embodiments, the apparatus 805 may apply a direct liquid injection CVD (DLICVD) process (e.g., a CVD in which the precursors are in liquid form, for example, a liquid or solid dissolved in a solvent). Liquid solutions may be injected in the apparatus 805 towards one or more injectors. The precursor vapors may then be transported to the interference structure or electroactive device as in CVD. DLICVD may be used on liquid or solid precursors, and high growth rates for the deposited materials may be reached using this technique.

In some embodiments, the apparatus 805 may apply a hot wall CVD process (e.g., CVD in which the chamber of the apparatus 805 is heated by an external power source and the materials of the electroactive device is heated by radiation from the heated wall of the chamber). In another embodiment, the apparatus 805 may apply a cold wall CVD process (e.g., a CVD in which only the materials of the interference structure or electroactive device is directly heated, for example, by induction, while the walls of the chamber are maintained at room temperature).

In some embodiments, the apparatus 805 may apply a microwave plasma-assisted CVD (MPCVD) process, where microwaves are used to enhance chemical reaction rates of the precursors. In another embodiment, the apparatus 805 may apply a plasma-enhanced CVD (PECVD) process (e.g., CVD that uses plasma to enhance chemical reaction rates of the precursors). In some embodiments, PECVD processing may allow deposition of materials at lower temperatures, which may be useful in withstanding damage to the materials of the interference structure or electroactive device or in depositing certain materials (e.g., organic materials and/or some polymers).

In some embodiments, the apparatus 805 may apply a remote plasma-enhanced CVD (RPECVD) process. In some embodiments, RPECVD may be similar to PECVD except that the materials of the interference structure or electroactive device may not be directly in the plasma discharge region. In some embodiments, the removal of the materials of the interference structure or electroactive device from the plasma region may allow for the reduction of processing temperatures down to room temperature.

In some embodiments, the apparatus 805 may apply an atomic-layer CVD (ALCVD) process. In some embodiments, ALCVD may deposit successive layers of different substances to produce an electroactive device that includes layered, crystalline film coatings.

In some embodiments, the apparatus 805 may apply a combustion chemical vapor deposition (CCVD) process. In some embodiments, CCVD (also referred to as flame pyrolysis) may refer to an open-atmosphere, flame-based technique for depositing high-quality thin films (e.g., layers of material ranging from fractions of a nanometer (monolayer) to several micrometers in thickness) and nanomaterials, which may be used in forming the materials of the interference structure or electroactive device.

In some embodiments, the apparatus 805 may apply a hot filament CVD (HFCVD) process, which may also be referred to as catalytic CVD (cat-CVD) or initiated CVD (iCVD), as noted above. In some embodiments, this process may use a hot filament to chemically decompose the source gases to form the materials of the interference structure or electroactive device. Moreover, the filament temperature and temperature of portions of the interference structure or electroactive device may be independently controlled, allowing colder temperatures for better adsorption rates at the interference structure or electroactive device, and higher temperatures necessary for decomposition of precursors to free radicals at the filament.

In some embodiments, the apparatus 805 may apply a hybrid physical-chemical vapor deposition (HPCVD) process. HPCVD may involve both chemical decomposition of precursor gas and vaporization of a solid source to form the materials on the interference structure or electroactive device.

In some embodiments, the apparatus 805 may apply metalorganic chemical vapor deposition (MOCVD) process (e.g., a CVD that uses metalorganic precursors) to form materials on the interference structure or electroactive device.

In some embodiments, the apparatus 805 may apply a rapid thermal CVD (RTCVD) process. This CVD process uses heating lamps or other methods to rapidly heat the interference structure or electroactive device. Heating only materials deposited on a substrate on which the electroactive device is formed rather than undeposited precursors or chamber walls may reduce unwanted gas-phase reactions that may lead to particle formation in the interference structure or electroactive device.

In some embodiments, the apparatus 805 may apply a photo-initiated CVD (PICVD) process. This process may use UV light to stimulate chemical reactions in the precursor materials used to make the materials for the interference structure or electroactive device. Under certain conditions, PICVD may be operated at or near atmospheric pressure.

In various embodiment, while CVD process are generally described above the various materials described herein (e.g., the curable materials), the non-curable material, the conductive materials, and any additional materials and layers may be disposed (e.g., on a substrate) in any suitable manner. As noted, a substrate may generally refer to any material (e.g., a layer) on which another layer or element is formed. In another embodiment, various materials for forming the electroactive device may be printed (e.g., via inkjet printing, silkscreen printing, etc.). In some embodiments, inkjet printing may refer to a type of computer printing that operates by propelling droplets of material onto a substrate (e.g., a flexible or inflexible substrate). In some embodiments, silkscreen printing may refer to a printing technique whereby a mesh is used to transfer a material (e.g., curable material and/or non-curable material) onto a substrate (e.g., a flexible or inflexible substrate), except in areas made impermeable to the material by a blocking stencil. A blade or squeegee may be moved across the screen to fill the open mesh apertures with the material, and a reverse stroke may then cause the screen to touch the substrate momentarily along a line of contact. This may cause the material to wet the substrate and be pulled out of the mesh apertures as the screen springs back after the blade has passed. In one embodiment, the materials may be vaporized (e.g., via thermal evaporation, CVD, PVD, and the like), as described above. In at least one embodiment, materials for forming the device may be disposed (e.g., on a substrate) using a co-flow process and/or a roll-to-roll process. In some embodiments, monomers (or oligomers, and/or prepolymers and other pre-cursor materials) for forming an electroactive polymer materials may optionally be mixed with a solvent and the solvent may be removed from the electroactive polymer during and/or following curing to form nanovoids within the electroactive polymer.

FIG. 9 shows a diagram of an example method of using an interference structure, in accordance with example embodiments of the disclosure. In an aspect, a protected structure 900 may include a first removable material 901 (e.g., a peelable material), an interference structure 902 that may include a buffer material 903, and a second removable material 906. In particular, the first removal material 901 and the second removable material 906 may serve to protect the interference structure 902 from external elements (dust, debris, etc.) and may allow the interference structure 902 to be coupled to a surface of an optical element (e.g., a substrate or any suitable optical element).

In another embodiment, as noted, the protected structure 900 may include a first removable material 901 (e.g., a peelable material). In another embodiment, the first removable material 901 may include viscoelastic polymers with their rheology tuned to the desired bonding and de-bonding characteristics needed. In another embodiment, the first removable material 901 may include acrylate polymer, rubber (either natural rubber or synthetic thermoplastic elastomer, silicone rubber), and the like. In another embodiment, these materials may be blended with a tackifier to produce tack (e.g., a term that refers to the grabbing power of the first removable material 901) at room temperature, may be somewhat deformable, may have low surface energy, and may be moisture resistant. Further, the materials may have a low cross-linking density, low viscosity ($\eta < 10{,}000$ cP), and may have broad molecular weight distribution to enable deformation of the adhesive material to the rough surface of an underlying substrate under various temperatures and peel conditions.

In one aspect, the protected structure 900 may optionally include a buffer material 903. In one aspect, the buffer material 903 may provide a planarization or passivation to the surface of the optical element that the interference structure 902 is ultimately laminated on. In an embodiment, the buffer material 903 may include any suitable material. For example, the buffer material 903 may include a polyolefin-based resin such as polypropylene, polymethylpentene, and a cyclic olefin-based polymer (e.g. norbornene-based resins, triacetyl cellulose, polyethylene terephthalate, polycarbonate resin, polyethylene naphthalate, polyurethane, polyether ketone, polysulfone, polyether sulfone, polyester, polystyrene-based resin, or acrylic-based resin).

In another embodiment, the interface between the first removal material 901 and the buffer material 903 and/or the interference structure 902 may include an adhesive layer (not shown). In one aspect, the adhesive layer may be made of any material. To the face of the adhesive layer opposite to the face where the buffer material 903 is provided, a separator film (e.g. polyethylene terephthalate (PET), not shown) for protection of the adhesive layer may be adhered.

In various embodiment, any suitable adhesive may be used. For example, the adhesive may be a self-assembled monolayer, a pressure sensitive adhesive (PSA), a standard reactive adhesive, or the like. Self-assembled monolayer adhesives may use a silane coupling agent including an alkoxysilane and a reactive functional group. The silane coupling unit may covalently react with a glass substrate and the reactive functional group may react with the interference structure 902. Examples of silane coupling agents may include, for example, 3-glycidoxypropyltrimethoxysilane, (2-aminoethyl)aminopropyltriethoxysilane, aminopropyltrimethoxysilane, aminopropyltriethoxysilane, (2-aminoethyl)aminopropylmethyldimethoxysilane, methacyryloxypropylmethyltrimethoxysilane, ethacyryloxypropyltrimethoxysilane, glycidoxypropyltrimethoxysilane, mercaptopropyl trimethoxysilane, vinyltriacetoxysilane, chloropropyltrimethoxysilane, vinyltrimethoxysilane, octadecyldimethyl-[3-(trimethoxysilyl)propyl]ammonium chloride, mercaptopropyl-methyl-dimethoxysilane, isocyanatopropyltriethoxysilane, (3-acryloxpropyl)trimethoxy-silane, and the like.

PSAs may usually be polymeric materials applied between two layers for forming a bond with the desired cohesive strength upon application of a pressure. A primary mode of bonding for a pressure sensitive adhesive may not be chemical or mechanical, but rather may be a polar attraction of an adhesive to a given material. Pressure sensitive adhesives may be designed with a balance between flow and resistance to flow. The bond may form because the adhesive may be soft enough to flow or wet the substrate. The bond may have strength because the adhesive may be hard enough to resist flow when stress is applied to the bond. Once the adhesive and the substrate are in proximity of each other, additional molecular interactions occur, such as, for example, Van der Waals' forces, capillary forces and the like, or combinations thereof, which may provide a significant contribution to the strength of the bond.

When peeled from a surface (e.g., when removed from the buffer material 903), the adhesive may demonstrate a clean peel, cohesive splitting, delamination and the like, or combinations thereof. The rate of bond formation may be determined by the conditions under which the adhesive contacts a surface and is controlled by the surface energy of the adhesive, the surface energy of the substrate, and the viscosity of the adhesive. Cohesion is the property of a pressure sensitive adhesive that allows it to resist shear stress. Cohesion may further be a measure of an adhesive's internal bond strength. Good cohesion may be necessary for a clean peel. In an embodiment, the adhesive layer may include a material that has a first index of refraction that is substantially similar to at least one of an index of refraction of an optical element or an index of refraction of the interference structure 902.

In one aspect, the protected structure 900 may include a second removable material 906 (e.g., a peelable material). FIG. 9 shows a diagram of an example method of using an index gradient structure, in accordance with example embodiments of the disclosure. In another embodiment, the protected structure 900 may include a second removable material 906 (e.g., a peelable material). In another embodiment, the second removable material 906 may include viscoelastic polymers with their rheology tuned to the desired bonding and de-bonding characteristics needed. In another embodiment, the second removable material 906 may include acrylate polymer, rubber (either natural rubber or synthetic thermoplastic elastomer, silicone rubber), and/or the like. In another embodiment, these materials may be blended with a tackifier to produce tack (e.g., a term that may refer to the grabbing power of the second removable material 906) at room temperature, may be somewhat deformable, may have low surface energy, and/or may be moisture resistant. Further, the materials may have a low cross-linking density, low viscosity ($\eta < 10{,}000$ cP), and/or may have broad molecular weight distribution to enable deformation of the adhesive material to the rough surface of an underlying substrate under various temperatures and peel conditions.

In various aspects, FIG. 9 illustrates aspects of the attachment of the interference structure 902 to a substrate 908. In another embodiment, the first removable material 901 may be removed from the protected structure 900, to reveal a surface of the buffer material 903 (or if the buffer material 903 is not included in the protected structure 900, a surface of the interference structure 902). Thereafter, the surface of the buffer material 903 may be coupled 911 (e.g., laminated, pressure laminated, etc.) onto a surface of the substrate 908, thereby yielding a semi-protected structure 910, as shown in FIG. 9.

In particular, the semi-protected structure 910 may still have a second removable material 906 that may protect the interference structure 902. However, the removable material 906 may be subsequently removed (e.g., peeled away) to yield a structure 915 that includes the exposed surface of the index interference structure 902, as shown in FIG. 9.

FIG. 10 shows an example flow diagram 1000 illustrating example steps in fabricating a nanovoided material (e.g., a holographic material) that may be used as an interference structure, in accordance with example embodiments of the disclosure. At step 1002, a curable material may be irradiated with a first coherent light source and a second coherent light source to generate an interference pattern in the curable material. In another embodiment, the curable material may include a monomer (e.g., acrylates or any type of photo-initiable monomer), an initiator (e.g., molecules including vinyl, azo, and peroxide groups), and solvent. The curable material may be disposed on a substrate. Further, the curable material may include thermoplastic polymers, as described in connection with FIG. 1, above.

In some embodiments, the curable material may include monomers that may be monofunctional or polyfunctional, or mixtures thereof. Polyfunctional monomers may be used as crosslinking agents to add rigidity or to form elastomers. Polyfunctional monomers may include difunctional materials such as bisphenol fluorene diacrylate, trifunctional materials such as trimethylolpropane triacrylate (TMPTA), or higher functional materials. Other types of monomers may be used, including isocyanates, and these may be mixed with monomers with different curing mechanisms.

In another embodiment, the curable material may include a free-radical polymerizing monomer, including for example, acrylate monomers. In one aspect, the acrylate monomers may be monofunctional, such as methyl methacrylate, ethyl methacrylate, methyl acrylate, and acrylic acid. In one aspect, the acrylates may also be polyfunctional, such as di-, tri-, or higher order functional acrylates. In another embodiment, the polyfunctional acrylates may be used to create crosslinked polymers. Combinations of monofunctional and polyfunctional acrylates may be used to create polymers with the desired properties.

In another embodiment, the curable material may be irradiated with two sources of coherent light (not shown) spaced apart from each other and shining on the same general region of the curable material to generate an interference pattern in the curable material. In another embodiment, the exposure time of the curable material to a first coherent light (e.g., first laser light) and a second coherent light (e.g., second laser light) may be controlled to generate a volume hologram from the curable material.

In particular, the curable material including the solvent and the monomer may be exposed to a first type of radiation (e.g., ultraviolet, UV, light) to trigger the initiator to create free radicals. The monomer may then polymerize to form a polymer. In another embodiment, the solubility parameter of the polymer may be different than the solubility parameter of the monomer, and therefore, the polymer may precipitate out of the matrix of materials (e.g., monomer, solvent, and initiator material). This may thereby generate dense regions of relatively high polymer concentration where the polymer tends to retract itself and excludes the solvent to neighboring regions, thereby leading to the formation of the nanovoided polymer.

At step 1004, a plurality of polymerized regions may be generated from a portion of the curable material based on the interference pattern. In one aspect, the interference pattern described above in the curable material may lead to the selective polymerization of regions of the curable material where there is constructive interference of light. In some embodiments, the formation of the nanovoids via the process described above may not only include providing a solution which is exposed to UV light to cause phase separations and thereby create voids (e.g., 50 to 100 nanometer wide voids), but rather, may further include generating interference patterns using the radiation source (e.g., UV light) in the curable material. Accordingly, regions of high UV intensity and regions of low UV intensity may be provided in the curable material. Further, where a high intensity of UV light is provided, an initiator may be triggered, which may locally generate regions for the polymerization of the monomer, thereby excluding the solvent to the adjacent regions. When the polymer is cured and/or dried, nanovoids may be generated in those adjacent regions.

At step 1006, a remaining portion of the curable material may be cured to form an interference structure including a cured nanovoided material that surrounds the polymerized regions, the interference structure including a first region having a first refractive index and a second region having a second refractive index. In another embodiment, the irradiation may include radiation emitted from an actinic radiation source (e.g., ultraviolet light, infrared radiation, and the like), which can be used to anneal the curable material and the nanovoids to thereby solidify holographic interference pattern and generate the final interference structure. In one aspect, a difference between the first refractive index and the second refractive index may be from approximately 0.3 to approximately 0.5. In another embodiment, the interference structure may include a thickness greater than a periodicity of the interference pattern or a thickness less than a periodicity of the interference pattern. In one aspect, the material may include a concentration of the plurality of nanovoids per unit volume of approximately 10% to approximately 70%.

FIG. 11 shows a diagram of a head-mounted display (HMD) 1100, in accordance with example embodiments of the disclosure. In some embodiments, the HMD 1100 may include an NED, which may include a display device 1104. The display device 1104 may present media to a user. Examples of media presented by the display device 1104 include one or more images, a series of images (e.g., a video), audio, or some combination thereof. In some embodiments, audio may be presented via an external device (e.g., speakers and/or headphones) that receives audio information from the display device 1104, a console (not shown), or both, and presents audio data based on the audio information. The display device 1104 may be generally configured to operate as an AR NED, such that a user may see media projected by the display device 1104 and see the real-world environment through the display device 1104. However, in some embodiments, the display device 1104 may be modified to also operate as a virtual reality (VR) NED, a mixed reality (MR) NED, or some combination thereof. Accordingly, in some embodiments, the display device 1104 may augment views of a physical, real-world environment with computer-generated elements (e.g., images, video, sound, etc.).

The display device 1104 shown in FIG. 11 may include a support or frame 1106 that secures the display device 1104 in place on the head of a user, in embodiments in which the display device 1104 includes separate left and right displays. In some embodiments, the frame 1106 may be a frame of eye-wear glasses. The display device 1104 may include structures (e.g., waveguides) with devices (e.g., electroactive switchable interference devices) as described herein. In some embodiments, the devices may be manufactured by the processes described herein.

As noted, the nanovoided material may be used in the fabrication of a switchable electroactive interference device. In some embodiments, the nanovoided material may be used to fabricate mirrors for AR systems that may include partially transparent displays that mix digital images with the real world. Light rays may reflect off a mirror to redirect into a user's eye. In other words, the eye may receive redirected rays from the digital display (e.g., from a projector or light-emitting diodes). Further, the optical device that combines the generated digital image with the real-world light may be referred to as a combiner. The combiner may operate like a partial mirror that redirects display light and selectively lets light in through from the real world. In such applications, a high reflectivity for the redirected light along with a high transmission for ambient light may be desired. In another embodiment, the combiner may be fabricated using the nanovoided material, such that when the combiner is switched on the combiner is reflective. Further, the display light may be pulsed, and the combiner may be switched off so that the combiner is transmissive for real-world light, but simultaneously reflects a portion of the display light for overlaying images onto the user's field of view. In some embodiments, the disclosed devices (e.g., a switchable interference structure) may have higher contrast, lower polarization sensitivity, and higher switching times than comparable devices that use liquid crystals.

Embodiments of the instant disclosure may include or be implemented in conjunction with an artificial reality system. Artificial reality is a form of reality that has been adjusted in some manner before presentation to a user, which, as noted, may include, e.g., a VR, an AR, a MR, a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An interference structure configured to generate a hologram, the interference structure comprising:
 a polymer matrix material defining a plurality of fluid-filled nanovoids arrayed in a periodic arrangement, the polymer matrix material comprising:
  a first region having a first refractive index; and
  a second region having a second refractive index, wherein the polymer matrix material comprises a first surface and a second surface opposite the first surface, the polymer matrix material having a thickness of from approximately 10 nm to approximately 2 µm between the first surface and the second surface;
 a first transparent conductor electrically coupled to the first surface of the polymer matrix material; and
 a second transparent conductor electrically coupled to the second surface of the polymer matrix material,
 wherein:
  the polymer matrix material has a first thickness between the first surface and the second surface when a first voltage is applied between the first transparent conductor and the second transparent conductor;
  the polymer matrix material has a second thickness between the first surface and the second surface when a second voltage is applied between the first transparent conductor and the second transparent conductor; and
  the first thickness is different than the second thickness.

2. The interference structure of claim 1, wherein a difference between the first refractive index and the second refractive index is approximately 0.3 to approximately 0.5.

3. The interference structure of claim 1, wherein the polymer matrix material comprises at least one of a polymer or an oxide.

4. The interference structure of claim 1, wherein the interference structure is fabricated using an interference pattern between two coherent light sources incident on a photo-polymerizable monomer.

5. The interference structure of claim 4, wherein at least one of the first thickness or the second thickness of the polymer matrix material between the first surface and the second surface is greater than a periodicity of the interference pattern.

6. The interference structure of claim 4, wherein the interference structure comprises a hologram material that has an index of refraction difference of approximately 0.4.

7. The interference structure of claim 6, wherein the hologram material comprises the plurality of nanovoids.

8. The interference structure of claim 1, wherein the polymer matrix material comprises a concentration of the plurality of nanovoids per unit volume of approximately 10% to approximately 90%.

9. The interference structure of claim 1, wherein the first voltage is applied between the first transparent conductor and the second transparent conductor in a first state, and the second voltage is applied between the first transparent conductor and the second transparent conductor in a second state, the first voltage being less than the second voltage.

10. The interference structure of claim 9, wherein a difference in refractive index between the first region and the second region is lower when the polymer matrix material is in the second state than when the polymer matrix material is in the first state.

11. The interference structure of claim 1, wherein a density of the polymer matrix material varies along a gradient between a higher-density region and a lower-density region, the lower-density region having a higher concentration of nanovoids.

12. An optical system, comprising:
 an optical component; and an interference structure coupled to the optical component, the interference structure configured to generate a hologram, the interference structure comprising:
- a polymer matrix material defining a plurality of fluid-filled nanovoids arrayed in a periodic arrangement, the polymer matrix material comprising:
  - a first region having a first refractive index; and
  - a second region having a second refractive index, wherein the polymer matrix material comprises a first surface and a second surface opposite the first surface, the polymer matrix material having a thickness of from approximately 10 nm to approximately 2 µm between the first surface and the second surface;
- a first transparent conductor electrically coupled to the first surface of the polymer matrix material; and
- a second transparent conductor electrically coupled to the second surface of the polymer matrix material, wherein:
- the polymer matrix material has a first thickness between the first surface and the second surface when a first voltage is applied between the first transparent conductor and the second transparent conductor;
- the polymer matrix material has a second thickness between the first surface and the second surface when a second voltage is applied between the first transparent conductor and the second transparent conductor; and
- the first thickness is different than the second thickness.

13. The optical system of claim 12, wherein the thickness of the polymer matrix material between the first surface and the second surface and a concentration of the plurality of nanovoids per unit volume in the polymer matrix material are configured to adjust an optical property associated with the optical system, the optical property comprising at least one of a reflectance, an absorption, or a transmittance of light incident on the optical system.

14. The optical system of claim 12, wherein the polymer matrix material is laminated to a surface of the optical component.

15. The optical system of claim 12, wherein the polymer matrix material is coupled to a surface of the optical component by an adhesive material.

16. The optical system of claim 15, wherein the surface of the optical component is convex, concave, flat, or irregular.

17. A method, comprising:
providing an interference structure comprising:
- a polymer matrix material defining a plurality of fluid-filled nanovoids arrayed in a periodic arrangement, the polymer matrix material comprising:
  - a first region having a first refractive index; and
  - a second region having a second refractive index, wherein the polymer matrix material comprises a first surface and a second surface opposite the first surface, the polymer matrix material having a thickness of from approximately 10 nm to approximately 2 µm between the first surface and the second surface;
- a first transparent conductor electrically coupled to the first surface of the polymer matrix material; and
- a second transparent conductor electrically coupled to the second surface of the polymer matrix material,
applying a first voltage between the first transparent conductor and the second transparent conductor, the polymer matrix material having a first thickness between the first surface and the second surface when the first voltage is applied;
applying a second voltage between the first transparent conductor and the second transparent conductor, the polymer matrix material having a second thickness between the first surface and the second surface when the second voltage is applied, wherein the first thickness is different than the second thickness.

18. The method of claim 17, wherein a difference between the first refractive index and the second refractive index is approximately 0.3 to approximately 0.5.

19. The method of claim 17, wherein at least one of the first thickness or the second thickness of the polymer matrix material between the first surface and the second surface is greater than a periodicity of the interference pattern.

20. The method of claim 17, wherein the polymer matrix material defines a concentration of the plurality of nanovoids per unit volume of approximately 10% to approximately 90%.

* * * * *